(12) United States Patent
Takashima

(10) Patent No.: US 8,159,914 B2
(45) Date of Patent: Apr. 17, 2012

(54) INFORMATION-RECORDING SYSTEM INCLUDING ERROR DETECTION AND A DATA RECORDING POSITION ADJUSTMENT UNIT AND METHOD, PROGRAM-STORING MEDIUM, AND PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 985 days.

(21) Appl. No.: 11/168,488

(22) Filed: Jun. 29, 2005

(65) Prior Publication Data

US 2006/0007801 A1      Jan. 12, 2006

(30) Foreign Application Priority Data

Jul. 8, 2004   (JP) .................................. 2004-201991

(51) Int. Cl.
*G11B 20/18*   (2006.01)
(52) U.S. Cl. ................. 369/53.17; 369/53.16; 369/59.12
(58) Field of Classification Search .......................... None
See application file for complete search history.

(56) References Cited

U.S. PATENT DOCUMENTS

| 5,553,045 A * | 9/1996 | Obata ......................... 369/53.17 |
| 6,373,800 B1 * | 4/2002 | Takahashi ................... 369/53.15 |
| 2003/0072236 A1 * | 4/2003 | Hirotsune et al. ......... 369/53.21 |
| 2004/0105363 A1 * | 6/2004 | Ko et al. .................... 369/47.14 |
| 2004/0125716 A1 * | 7/2004 | Ko et al. .................... 369/47.14 |
| 2005/0207305 A1 * | 9/2005 | Park ........................... 369/53.29 |

FOREIGN PATENT DOCUMENTS

| JP | 2000-112673 | 4/2000 |
| JP | 2000-268362 | 9/2000 |

* cited by examiner

*Primary Examiner* — Lixi C Simpson
(74) *Attorney, Agent, or Firm* — Oblon, Spivak, McClelland, Maier & Neustadt, L.L.P.

(57) ABSTRACT

[Object] To Reduce Read Errors.
[Solving Means] Where new data recording is started from LRA (old) and a record error is detected, at position P0, an extent is closed and the record position is made to jump from the position P0 to position P1. Further, a new extent is set, at the position P1 so that the data recording is continued. Further, a range from the position P0 where the record error was detected to the position P1 where the new data recording was started is registered, as a defect sector. The present invention can be used for a Blu-Ray-Disc-capable recording-and-reproducing system.

10 Claims, 19 Drawing Sheets

FIG. 8

| LSN | Structure | Descriptors | LBN |
|---|---|---|---|
| 0~15 | Volume Recognition Sequence | Reserved | |
| 16~18 | | Reserved | |
| 19~31 | Main Volume Descriptor Sequence | | |
| 32 | | Primary Volume Descriptor | |
| 33 | | Implementation Use Volume Descriptor | |
| 34 | | Partition Descriptor | |
| 35 | | Logical Volume Descriptor ③ | |
| 36 | | Unallocated Space Descriptor | |
| 37 | | Terminating Descriptor | |
| 38~47 | | Trailing Logical Sectors | |
| 48 | Logical Volume Integrity Sequence | Logical Volume Integrity Descriptor ④ | |
| 49 | | Terminating Descriptor | |
| 50~63 | | Trailing Logical Sectors | |
| 64~255 | | Reserved | |
| 256 | Anchor-1 ① | Anchor Volume Descriptor Pointer | |
| 257~271 | | Reserved | |
| 272~LSNall-272 | Partition | File Structure and Files ⑤ | 0~LBNall |
| LSNall-271~LSNall-257 | | Reserved | |
| LSNall-256 | Anchor-2 | Anchor Volume Descriptor Pointer | |
| LSNall-255~LSNall-224 | | Reserved | |
| LSNall-223~LSNall-208 | Reserved Volume Descriptor Sequence | (SAME AS Main Volume Descriptor Sequence) | |
| LSNall-207~LSNall-1 | | Reserved | |
| LSNall | Anchor-3 | Anchor Volume Descriptor Pointer | |

FIG. 9

| LBN | Structure | Descriptors |
|---|---|---|
| 0~A | Space Bitmap | Space Bitmap Descriptor |
| A+1 | File Set Descriptor Sequence | File Set Descriptor |
| A+2 | | Terminating Descriptor |
| A+3 | ICB for Root Directory | FE (Root Directory) |
| A+4 | Root Directory | FID (parent directory) |
| | | FID (BDMV) |
| | | FID (Resource) |
| | | FID (DATA1) |
| | | FID (DATA2) |
| A+5 | ICB for BDMV Directory | FE (BDMV) |
| A+6 | ICB for Resource Directory | FE (Resource) |
| A+7 | ICB for DATA1 Directory | FE (DATA1) |
| A+8 | ICB for DATA2 Directory | FE (DATA2) |
| A+9 | BDMV Directory | FID (parent directory) |
| | | FID (Unit_Key_Gen_Value.inf) |
| | | FID (CPS_CCI.inf) |
| | | ⋮ |
| A+10 | ICBs for files/directories under BDMV Directory | FID (STREAM) |
| A+11 | | FE (Unit_Key_Gen_Value.inf) |
| | | FE (CPS_CCI.inf) |
| ... | | ⋮ |
| A+16 | | FE (STREAM) |

INFORMATION-RECORDING SYSTEM INCLUDING ERROR DETECTION AND A DATA RECORDING POSITION ADJUSTMENT UNIT AND METHOD, PROGRAM-STORING MEDIUM, AND PROGRAM

TECHNICAL FIELD

The present invention relates to an information-recording system, an information-recording method, a program-storing medium, and a program, and particularly relates to an information-recording system, an information-recording method, a program-storing medium, and a program that are configured to record data onto a recording medium so that wherein where a record error occurs during the data is recorded, the record error can be identified during the data is reproduced, whereby the data recorded onto the recording medium can be read with high precision.

BACKGROUND ART

A technology for recording a file onto a large-capacity recording medium is becoming widely available.

Further, various formats for recording the file onto the large-capacity recording medium have been proposed.

For example, UDF (Universal Disc Format) used for a DVD (Digital Versatile Disc) has been proposed (refer to Non-Patent Document 1, for example).

[Non-Patent Document 1] Universal Disk Format Specification Revision 2.50 Apr. 30, 2003 Optical Storage Technology Association

DISCLOSURE OF THE INVENTION

Problems to be Solved by the Invention

Incidentally, in the past, where a record error occurs during real-time data is recorded onto a write-at-once medium (a recording medium on which data can be recorded only once), continuation of data recording assumes a higher priority than recording data correctly. Therefore, no particular processing was performed to cope with the record error. As a result, when the record error occurs, the recorded data includes a data loss.

That is to say, as shown in an upper section of FIG. 1, where file-system information and/or a file (File Str. & Files) is recorded from LRA (Last Recorded Area: the position where last data was recorded by the previous recording) on a recording medium and where a record error occurs at position P0, a data loss occurs in an area on the recording medium, where the area corresponds to a range that is indicated by oblique lines and shown in the drawing.

Here, in FIG. 1, a logical address is set in the right direction, as shown in this drawing. An area on the left side of the LRA (old) position shown in this drawing is an area in which data had already been recorded (Previous Recording) before the data recording is started and an area on the right side of the LRA (old) is an area in which data is currently recorded.

Further, the data recording is performed in units of SRR (Sequential Recording Ranges) corresponding to a track used for a CD-R (Compact Disc-recordable) or the like. The SRR is set to two modes including OPEN mode indicating that data can be recorded and CLOSE mode to which the SRR is set after the data recording is finished. Subsequently, in FIG. 1, the SRR is set to the CLOSE mode in the area on the left side of the LRA (old) and the SRR is set to the OPEN mode in the area on the right side of the LRA (old).

Further, during the data is recorded, information about a record-start position and a record-end position corresponding to a range including a series of data items is recorded, as an extent (Extent). The data is read according to the above-described position information that is recorded, as the extent.

Where a record error occurs at the position P0 shown in the upper section of FIG. 1, an area including a data loss is set in a range from the position P0 on down (a range on the right side of the position P0 shown in the drawing) and the data recording is continued. When the record error is resolved at position P0', data is recorded and LRA (new) is set at the position where the data recording is finished, as shown in a lower section of FIG. 1.

Thus, the data is recorded without delay, as has been described. However, the extent is set, so as to extend from the LRA (old) to the LRA (new) even though the data-loss area (the range from the position P0 to the position P0' shown in FIG. 1) is left.

As a result, where the data shown in the lower section of FIG. 1 is read, the range specified by the above-described extent is read, as a series of data items. Subsequently, the range is processed, as the series of data items (including no data-loss area), even though the range includes the data-loss area (the range from the position P0 to the position P0' shown in the lower section of FIG. 1). Therefore, if retry processing due to a read error arises during the read data is reproduced, for example, reading of the data for reproduction may be delayed and the data may be reproduced with decreased precision.

The present invention has been achieved for solving the above-described problems. Particularly, the present invention allows recording data so that wherein where a record error occurs during the data is recorded onto a recording medium, data at a position where the record error occurs is not read during the data is reproduced. Subsequently, the data recorded onto the recording medium can be read with high precision.

Means for Solving the Problems

An information-recording system of the present invention includes recording means configured to record data onto a recording medium, record-position-information generation means configured to generate record-position information according to a position at which recording of a series of items of the data starts and a position at which the recording ends at virtual addresses on the recording medium, where the data is recorded onto the recording medium by the recording means, error-detection means configured to determine whether or not an error occurs, where the data is recorded onto the recording medium by the recording means, and operation-control means configured to control the recording means so that the data-record position is made to jump from the position where the error is detected to a position away from the error-detected position by as much as a predetermined distance, where the error-detection means detects the error. When the error-detection means detects the error, the record-position-information generation means determines the position at which the recording of the series of data items starts and the position at which the error is detected at the virtual addresses on the recording medium to be the record-start position and the record-end position, and generates the record-position information.

The recording medium can be a write-once recording medium.

The recording medium can be a write-once optical disk configured to record and/or reproduce data by using a blue-violet laser.

The data can be included in a file managed based on Universal Disc Format.

The record-position-information generation means can register at least one range from the position where the error is detected to the position away from the error-detected position by as much as the predetermined distance, as a defect sector area.

The record-position-information generation means can mark the error-detected position with LRA, close an SRR at the position away from the error-detected position by as much as the predetermined distance, and open a new SRR at a position exceeding the position away from the error-detected position by as much as the predetermined distance.

An information-recording method of the present invention includes a recording step for recording data onto a recording medium, a record-position-information generation step for generating record-position information according to a position at which recording of a series of items of the data starts and a position at which the recording ends at virtual addresses on the recording medium, where the data is recorded onto the recording medium through the recording step, an error-detection step for determining whether or not an error occurs, where the data is recorded onto the recording medium through the recording step, and an operation-control step for controlling processing corresponding to the recording step so that the data-record position is made to jump from the position where the error is detected to a position away from the error-detected position by as much as a predetermined distance, where the error is detected through the error-detection step. When the error is detected through the error-detection step, the record-position-information generation step allows determining the position at which the recording of the series of data items starts and the position at which the error is detected at the virtual addresses on the recording medium to be the record-start position and the record-end position, and generating the record-position information.

A program of a program-storing medium of the present invention includes a recording-control step for controlling recording data onto a recording medium, a record-position-information generation control step for controlling generation of record-position information according to a position at which recording of a series of items of the data starts and a position at which the recording ends at virtual addresses on the recording medium, where the data is recorded onto the recording medium through the recording-control step, an error-detection control step for determining whether or not an error occurs, where the data is recorded onto the recording medium through the recording-control step, and an operation-control step for controlling processing corresponding to the recording-control step so that the data-record position is made to jump from the position where the error is detected to a position away from the error-detected position by as much as a predetermined distance, where the error is detected through the error-detection control step. When the error is detected through the error-detection control step, the record-position-information generation control step allows determining the position at which the recording of the series of data items starts and the position at which the error is detected at the virtual addresses on the recording medium to be the record-start position and the record-end position, and generating the record-position information.

A program of the present invention makes a computer execute processing including a recording-control step for controlling recording data onto a recording medium, a record-position-information generation control step for controlling generation of record-position information according to a position at which recording of a series of items of the data starts and a position at which the recording ends at virtual addresses on the recording medium, where the data is recorded onto the recording medium through the recording-control step, an error-detection control step for determining whether or not an error occurs, where the data is recorded onto the recording medium through the recording-control step, and an operation-control step for controlling processing corresponding to the recording-control step so that the data-record position is made to jump from the position where the error is detected to a position away from the error-detected position by as much as a predetermined distance, where the error is detected through the error-detection control step. When the error is detected through the error-detection control step, the record-position-information generation control step allows determining the position at which the recording of the series of data items starts and the position at which the error is detected at the virtual addresses on the recording medium to be the record-start position and the record-end position, and generating the record-position information.

According to an information-recording system, an information-recording method, and a program of the present invention, data is recorded onto a recording medium, record-position information is generated according to a position at which recording of a series of items of the data starts and a position at which the recording ends at virtual addresses on the recording medium, where the data is recorded onto the recording medium, it is detected whether or not an error occurs, where the data is recorded onto the recording medium, and control is performed so that the data-record position is made to jump from the position where the error is detected to a position away from the error-detected position by as much as a predetermined distance, where the error is detected. When the error is detected, the position at which the recording of the series of data items starts and the position at which the error is detected at the virtual addresses on the recording medium are determined to be the record-start position and the record-end position, and the record-position information is generated.

The information-recording system of the present invention may be provided, as an independent apparatus, or a block configured to record information.

Advantages

The present invention allows reading data stored in a recording medium with high precision.

BEST MODE FOR CARRYING OUT THE INVENTION

Embodiments of the present invention will be described below. According to an example relationship between the present invention disclosed in this specification and the embodiments, the description is provided only for ensuring that the embodiments supporting the present invention disclosed in this specification are written in this specification. Therefore, if the description includes a first predetermined embodiment that is not written, as the embodiment corresponding to the present invention, the first predetermined embodiment may correspond to the present invention. On the contrary, if the description includes a second predetermined embodiment that is written, as the embodiment corresponding to the present invention, the second predetermined embodiment may correspond to other inventions.

Further, the description does not support the entire present invention disclosed in this specification. In other words, the description supports the present invention disclosed in this specification and does not deny the existence of an invention that is not claimed in this application. Namely, the description does not deny the existence of at least one invention that may appear in the future. The above-described invention may be an invention that is divided off from the present invention, or an invention that is generated or added by amendment.

Namely, an information-recording system of the present invention includes recording means (e.g., a write unit 73 shown in FIG. 3) configured to record data onto a recording medium, record-position-information generation means (e.g., a file-system-information generation unit 62 shown in FIG. 3) configured to generate record-position information according to a position at which recording of a series of data items starts and a position at which the recording ends at virtual addresses on the recording medium, where the data is recorded onto the recording medium by the recording means, error-detection means (e.g., a monitor unit 55 shown in FIG. 3) configured to detect whether or not an error occurs, where the data is recorded onto the recording medium by the recording means, and operation-control means (e.g., a control unit 51 shown in FIG. 3) configured to control the recording medium so that the data-record position is made to jump from a position where an error is detected to a position away therefrom by as much as a predetermined distance, where the error-detection means detects the error. Where the error-detection means detects the error, the record-position-information generation means determines the position at which the recording of the series of data items starts and the position at which the error is detected at virtual addresses on the recording means to be a record-start position and a record-end position, and generates the record-position information.

Information-recording processing according to the present invention includes a recording step for recording data onto a recording medium (e.g., processing corresponding to step S3 shown in a flowchart of FIG. 14), a record-position-information generation step (e.g., processing corresponding to steps S35 and S9 shown in the flowchart of FIG. 14) for generating record-position information according to a position at which recording of a series of data items starts and a position at which the recording ends at virtual addresses on the recording medium, where the data is recorded onto the recording medium at the recording step, an error-detection step (e.g., processing corresponding to step S4 shown in the flowchart of FIG. 14) for detecting whether or not an error occurs, where the data is recorded onto the recording medium at the recording step, and an operation-control step (e.g., processing corresponding to step S6 shown in the flowchart of FIG. 14) for controlling the processing performed at the recording step so that the data-record position is made to jump from the position where an error is detected to a position away therefrom by as much as a predetermined distance, where the error is detected at the error-detection step. Where the error is detected at the error-detection step, the position at which the recording of the series of data items starts and the position at which the error is detected at the virtual addresses on the recording medium are determined to be a record-start position and a record-end position, and the record-position information is generated, at the record-position-information generation step.

Since the details of a program-storing medium and a program are the same as those of the information-recording method, the description thereof is omitted.

FIG. 2 shows the configuration of a recording-and-reproducing system 1 according to an embodiment of the present invention.

A CPU (Central Processing Unit) 11 executes various processing procedures according to a program stored in an ROM (Read Only Memory) 12 and/or a storage unit 18. A RAM (Random Access Memory) 13 stores a program executed by the CPU 11 and/or data, as required. The above-described CPU 11, ROM 12, and RAM 13 are connected to one another via a bus 14.

An input-and-output interface 15 is connected to the CPU 11 via the bus 14. An input unit 16 including a keyboard, a mouse, a microphone, and so forth, and an output unit 17 including a display, a speaker, and so forth are connected to the input-and-output interface 15. The CPU 11 executes various processing procedures according to an instruction transmitted from the input unit 16. Then, the CPU 11 externally transmits an image, speech, and so forth that are obtained through the processing procedures to the output unit 17.

The storage unit 18 connected to the input-and-output interface 15 includes a hard disk, for example, and stores a program executed by the CPU 11 and various types of data. A communication unit 19 communicates with an information-processing apparatus such as an external server via a network such as the Internet, an intranet, and so forth.

Further, the storage unit 18 stores various programs and the CPU 11 reads the programs and executes the processing corresponding thereto. The storage unit 18 stores an OS functioning as a basic program and/or a driver, for example. Without being limited to the above-described configuration, the programs stored in the storage unit 18 may be obtained and stored via the communication unit 19.

An image-and-speech codec 20 decompresses the file of an image and/or speech in a predetermined manner, where the file is compressed by a predetermined compression system and read from a magnetic disk 41, an optical disk 42, a magneto-optical disk 43, or a semiconductor memory 44 that are connected to a drive 30, or a recording medium 81 of a recording-and-reproducing mechanism 22 (FIG. 3). Then, the image-and-speech codec 20 transmits the file to an external-connection I/F (Interface) 21 and the output unit 17. Further, the image-and-speech codec 20 compresses an image signal and/or a speech signal transmitted from the input unit 16 and/or the external-connection I/F 21 by a predetermined method and stores the image signal and/or the speech signal in the magnetic disk 41, the optical disk 42, the magneto-optical disk 43, or the semiconductor memory 44 that are connected to the drive 30, or the recording medium 81 of the recording-and-reproducing mechanism 22 (FIG. 3).

The recording-and-reproducing mechanism 22 stores predetermined information in the recording medium 81 (FIG. 3) such as a Blu-Ray Disk (trade name) and/or reads information stored in the recording medium 81. Incidentally, the detailed configuration of the recording-and-reproducing mechanism 22 will be described later with reference to FIG. 3.

When the magnetic disk 41, the optical disk 42, the magneto-optical disk 43, or the semiconductor memory 44 is inserted in the drive 30 connected to the input-and-output interface 15, the drive 30 drives the disk and obtains a program and/or data stored therein. The obtained program and/or data is transferred and stored in the storage unit 18, as required.

Next, operations of the recording-and-reproducing system 1 shown in FIG. 2 will be described.

When an instruction for storing input data transmitted is transmitted from the input unit 16 via the external-connection I/F 21, the CPU 11 controls the image-and-speech codec 20 based on the program stored in the ROM 12, the RAM 13, or the storage unit 18, compresses the input data by the predetermined compression method, transmits the input data to the recording-and-reproducing mechanism 22, and stores the input data in the recording medium 81 (FIG. 3) that will be described later.

Further, when an instruction for reproducing the data stored in the recording medium 81 inserted in the recording-and-reproducing mechanism 22 is transmitted from the input unit 16, the CPU 11 controls the recording-and-reproducing mechanism 22 based on the program stored in the ROM 12, the RAM 13, or the storage unit 18, reproduces the data stored in the recording medium 81, and transmits the data to the image-and-speech codec 20. Further, the CPU 11 controls the image-and-speech codec 20, decompresses the input data by a predetermined decompression method, and externally transmits the input data via the external-connection I/F 21. Otherwise, the input data is externally transmitted by the output unit 17 so that the data is displayed and/or speech is output.

Next, the detailed configuration of the recording-and-reproducing mechanism 22 will be described with reference to FIG. 3.

A control unit 51 controls the entire operations of the recording-and-reproducing mechanism 22. Namely, the control unit 51 controls a record unit 52 based on a control signal transmitted from the CPU 11 so that a recording-and-reproducing block 53 records information onto the recording medium 81 and/or controls a reproduce unit 54 so that the recording-and-reproducing block 53 reads the information recorded onto the recording medium 81.

A file-system-information generation unit 62 of the control unit 51 divides the input data into groups so that the input data is grouped under predetermined attributes of the files thereof, determines the record position on the recording medium 81, and records the files. Further, the file-system-information generation unit 62 generates file-system information based on the above-described information and transmits the file-system information to the record unit 52 so that the file-system information is recorded onto the recording medium 81.

At that time, the file-system-information generation unit 62 registers a range in which the file data is sequentially recorded on the recording medium 81 with FE (FileEntry) in units of extent according to a format that will be described later.

Here, the file is read based on the record-position information registered with the FE. The FE includes extents indicating the positions of addresses at which data items forming the files are recorded on the recording medium. The extent denotes the information about the head position and the end position of the address at which the data is sequentially recorded. The FE may include a plurality of the extents. The position at which the data forming the file is recorded is identified based on the extent information, whereby the data is sequentially read. The file is decompressed based on the read data so that the file is read. Therefore, when the plurality of extents is registered with the FE, the file is written, as data separately recorded at different positions.

Further, upon receiving the information about a record error transmitted from the monitor unit 55, the file-system-information generation unit 62 closes the extent, makes the record position jump to a predetermined position, and controls the write unit 73 so that the write unit 73 records the data from the predetermined position on down. Namely, the file-system-information generation unit 62 records a range from the position at which data recording is started at an address on the recording medium 81 to a position at which a record error is detected, as a first extent (closes the extent), and starts data recording at a new position to which the record position is made to jump by as much as a predetermined distance (a distance of about several to several tens of MB) (sets a new extent).

Further, at that time, the file-system-information generation unit 62 stores a range from the position at which the record error is detected to the position at which the new extent is set (a range from a position following the position at which the record error is detected to a position immediately preceding the position to which the record position is made to jump and at which the data recording is newly started), as a defect sector, and records the range onto the recording medium 81. Subsequently, when n record errors are detected during a first file is recorded, at least (n+1) extents are set in the FE of the file.

A file-system-information identification unit 61 of the control unit 51 reads the file-system information transmitted from the reproduce unit 54 and reads a predetermined file based on the file-system information. More specifically, the file-system-information identification unit 61 reads the recorded file-system information by controlling a read unit 91 and specifies a read position on the recording medium 81 by controlling the read unit 91 based on the information about the extent included in the FE of a file specified to be read, whereby the data is sequentially read and the data of the specified file is read.

The recording-and-reproducing block 53 is controlled by the write unit 73 and/or the read unit 91, so as to physically record and/or reproduce information onto/from the recording medium 81. The recording medium 81 may record information mechanically, optically, magnetically, and/or magnetooptically. Further, the recording medium 81 may be a rewritable medium (including a BD-RE (Blu-Ray Disc-Rewritable), a DVD-RW (Digital Versatile Disc-Rewritable), or a DVD-RAM (Digital Versatile Disc-Random Access Memory), for example), or a write-once medium (including a BD-R (Blu-Ray Disc-Recordable), a DVD-R (Digital Versatile Disc-Recordable), or a DVD-ROM (Digital Versatile Disc-Read Only Memory), for example). Thus, the recording medium 81 can be provided in any form, so long as it is a disc-shaped recording medium that can record and reproduce data. Therefore, the recording-and-reproducing block 53 can be provided in any form, so long as it can record and reproduce data, corresponding to the above-described recording medium 81. Particularly, the recording-and-reproducing block 53 is useful for a large-capacity recording medium such as an optical disk configured to record and reproduce information by using a blue-violet laser.

An ECC-encoding unit 71 adds an error-correction code to an input, encodes the error-correction code, and externally transmits the code to a modulation unit 72. The modulation unit 72 modulates the data transmitted from the ECC-encoding unit 71 and externally transmits the data to the write unit 73. The write unit 73 transmits the data transmitted from the modulation unit 72 to the recording-and-reproducing block 53 and makes the recording-and-reproducing block 53 write the data onto the recording medium 81.

The read unit 91 of the reproduce unit 54 reads information stored in the recording medium 81. A demodulation unit 92 demodulates the data read from the recording medium 81 by the read unit 91 and transmits the data to an ECC-decoding unit 93. The ECC-decoding unit 93 separates the data transmitted from the demodulation unit 92 into an ordinary file (e.g., AV (Audio Visual) stream data) and file-system information and file-system information. Then, the ECC-decoding unit 93 externally transmits the ordinary file, as output data, and externally transmits the file-system information to the control unit 51.

The monitor unit 55 detects an error in a signal that is stored in the recording medium 81 and that is transmitted from the write unit 73 to the recording-and-reproducing block 53 (e.g., when the difference between adjacent signals is measured and determined to be significantly large, it is determined that an error occurs between the adjacent signals (usually, since the values of the adjacent signals are relatively close to each other, the difference therebetween is small), or an error in a servomechanism configured to record data onto the recording medium 81 in the recording-and-reproducing block 53 (e.g., where tracking deviates significantly) and determines whether or not a record error occurs. When the record error is detected, the monitor unit 55 informs the control unit 51 that the record error occurred.

Next, the management configuration of the files of input data that is grouped and managed by the file-system-information generation unit 62 will be described, with reference to FIG. 4. Further, in the case of the recording medium 81, a file is basically recorded based on the UDF method. Therefore, each of the files is recorded onto the recording medium 81 based on the UDF method according to the management configuration described below.

FIG. 4 shows an example where various files are managed, when AV stream data is recorded onto a rewritable recording medium. The management configuration conforms to a management configuration based on the Blu-Ray Disc Rewritable (trade name) standard (Although the management configuration is based on the Blu-Ray Disc Rewritable (trade name) standard, the record system is based on the UDF method.). In FIG. 4, three layers including a content-management layer, a playlist layer, and a clip layer are shown in a downward direction. The above-described management configuration can be used for the Blu-Ray Disc Recordable (trade name).

Here, the content-management layer includes a playlist management table 111 and a thumbnail management table 112. The playlist layer includes playlists 113-1 to 113-3. Further, the clip layer includes clip data items 121-1 to 121-3. Hereinafter, where there is no need to discriminate between the playlists 113-1 to 113-3 and the clip data items 121-1 to 121-3, the playlists are referred to as the playlist 113 and the clip data items are referred to as the clip data 121. In other configurations, Playlists and clip data are also referred to as in the same way.

The two files of an AV stream 131 and the clip data 121 (having the AV-stream attribute information) are integrated with each other and especially referred to as a clip. For example, the AV stream 131 is MPEG-TS (Moving Picture Experts Group-Transport Stream) data and a file including multiplexed information such as Video information, Audio information, subtitle information, and so forth. Further, the AV stream 131 may include multiplex command information for performing reproduction control. This drawing shows an example where the file includes the multiplex command information.

The playlist includes a plurality of play items configured to refer to a predetermined range of the clip by using a reproduction-start point and a reproduction-end point and provides the function of reproducing a plurality of reproduction sequences by using a single playlist. Further, the playlist management table 111 for providing a user with a table of the playlists and the thumbnail-management table 112 used for the thumbnail-display function, and thumbnail files 141-1 and 141-2 and thumbnail files 151-1 and 151-2 that correspond to the above-described tables are provided.

A single AV stream 131 and information attached thereto are determined to be a single object and referred to as the clip. An AV-stream file is referred to as an AV-stream file and information attached thereto is referred to as the clip data 121.

Usually, a file used for a computer or the like is handled, as a byte string. However, the contents of the AV stream 131 are expanded on the time axis and the playlist 113 usually specifies an access point in the clip data 121 by using a time stamp. When the playlist 113 provides the time stamp of the access point in the clip, the clip data 121 is used for finding information about an address at which stream decoding should be started (the data-byte position) in the AV stream 131.

The playlist 113 has been introduced for selecting a reproduction section the user wants to see from the clip and easily editing the reproduction section. A single playlist 113 includes a set of reproduction sections provided in the clip. A single reproduction section in a predetermined clip is referred to as a play item shown as a pair of a point IN and a point OUT on the time axis. Thus, the playlist includes a set of the play items.

In FIG. 4, the files are grouped as below according to the use-and-update frequency and the maximum total size of the files included in a group. The playlist-management table 111, the thumbnail management table 112, and the playlists 113 are included in group 1 and the clip data 121 is included in group 2, the menu-thumbnail files 141 and 142 are included in group 3, and the mark-thumbnail files 151 and 152 are included in group 4.

The above-described grouped files are management data required for reproducing the AV stream 131. Since the above-described management data is extracted and managed at a single place, it becomes possible to quickly read the management data. As a result, the AV-stream data can be reproduced with high speed.

As has been described, the management data files of the AV stream 131 are grouped. However, it becomes possible to group files that are not defined based on the Blu-ray Disc Rewritable standard. Namely, in the drawing, group X is defined, as the group of files different from the management-data files of the AV stream 131 and files 161-1 and 161-2 are included in the group X. Here, files 171-1 and 171-2 shown n the drawing are files that are not grouped. Further, the AV stream 131 is not subjected to the group management, since the AV stream 131 is not management data.

FIG. 5 shows an example directory configuration of Blu-Ray Disc Audio Visual (BDAV) information that is recorded onto the recording medium 81 and defined based on Blu-Ray Disc Rewritable Format (BD-RE). Here, although other directories may be generated under a root directory, those directories are ignored in the case where a BDAV-capable recorder/player is used. Further, the directory configuration shown in FIG. 5 can be used for the Blu-Ray Disc Recordable (BD-R).

The root directory includes a single directory, as shown in the above-described drawing.

The "BDAV" directory includes the entire files and directories defined by a BDAV application format. Further, the "BDAV" directory includes directories described below.

A "PLAYLIST" directory includes a database file of the playlist 113. The directory is set even though no playlist 113 is provided.

A "CLIPINF" directory includes a database of the clip. The directory is set even though no clip is provided.

A "STREAM" directory includes an AV-stream file. The directory is set even though no AV-stream file is provided.

A "BACKUP" directory includes a backup file of the file included in the group 1 or the group 2. The directory is set even though no file included in the group 1 or the group 2 is provided.

The "PLAYLIST" directory includes two types of PlayList files including a Real PlayList and a Virtual PlayList. In FIG. 5, files 11111.rpls and 22222.vpls are included. The file indicated by the specifier "xxxxx.rpls" holds information relating to a single Real PlayList and a single file is generated for each playlist. Here, the specifier "xxxxx" denotes five numbers, where each of the numbers is from zero to nine.

A file indicated by the specifier "yyyyy.vpls" holds information relating to a single Virtual PlayList and a single file is generated for each playlist. The file name is "yyyyy.vpls". Here, the specifier "yyyyy" denotes five numbers, where each of the numbers is from zero to nine.

It is assumed that the Real PlayList shares the stream portion of the clip to which the Real PlayList refers. Namely, the Real PlayList occupies the data space corresponding to the AV-stream portion of the clip to which the Real PlayList refers. When the AV stream is stored, as a new clip, a Real PlayList configured to refer to a reproducible range of the entire clip is generated. When part of the reproducible range of the Real PlayList is deleted, the data on the stream portion of the Clip to which the Real PlayList refers is also deleted.

It is assumed that the Virtual PlayList does not share the clip data. The clip does not change even though the Virtual PlayList is changed or deleted. Further, in this specification, the Real PlayList and the Virtual PlayList are generally referred to as the playlist.

The "CLIPINF" directory holds the single file corresponding to each of the AV-stream files. In FIG. 5, files 01000.clpi and 02000.clpi are held.

A file indicated by "zzzzz.clpi" denotes the clip data 121 corresponding to a single AV stream 131. The file name is "zzzzz.clpi" and the specifier "zzzzz" denotes five numbers, where each of the five numbers is from zero to nine.

The "STREAM" directory holds the AV-stream file. In FIG. 5, files 01000.m2ts and 02000.m2ts are held.

A file indicated by "zzzzz.m2ts" is the file of the AV stream 131. The file name is "zzzzz.m2ts" and the specifier "zzzzz" denotes five numbers, where each of the five numbers is zero to nine. Further, the same five numbers "zzzzz" are set for a single file of the AV stream 131 and the clip data 121 corresponding thereto, as the file name.

Further, menu1.tdt and menu2.tdt that correspond to the thumbnail files 141-1 and 141-2, and mark1.tdt and mark2.tdt that correspond to the thumbnail files 151-1 and 151-2 are held directly under the "BDAV" directory. Further, info.bdav that corresponds to the playlist-management table 111, and menu.tidx and mark.tidx that correspond to the thumbnail-management table 112 are held directly under the "BDAV" directory.

Further, a "DATA1" directory and a "DATA2" directory are set directly under the "root" directory. File1.dat, File2.dat, and so forth that correspond to files 161-1 and 161-2, and FileA.dat, FileB.dat, and so forth that correspond to files 171-1 and 171-2 are held, as files that are grouped and managed, under the directories.

In files and directories that are managed under the directories shown in FIG. 5, the menu1.tdt and the menu2.tdt corresponding to the thumbnail files 141-1 and 141-2 are included in the group 3 and held, the mark1.tdt and the mark2.tdt corresponding to the thumbnail files 151-1 and 151-2 are included in the group 4 and held, the info.bdav corresponding to the playlist-management table 111, the menu.tidx and the mark.tidx corresponding to the thumbnail-management table 112, and the 11111.rpls and 22222.vpls held in the "PLAYLIST" directory are included in the group 1 and held, and the 01000.clpi and 02000.clpi held in the "CLIPINF" directory are included in the group 2 and held, as shown in FIG. 4.

Further, other than the above-described files that are grouped and managed, the File1.dat and File2.dat corresponding to the files 161-1 and 161-2 held under the "DATA1" directory are grouped, as the group X.

FIGS. 4 and 5 show the management configuration suitable for performing grouping, where data is recorded onto the recording medium 81 based on the UDF method according to the Blu-Ray Disc Rewritable (a rewritable recording medium) standard. Next, an example management configuration (a logical format) suitable for performing grouping, where a Blu-Ray Disc ROM (a read-only recording medium) is used, will be illustrated with reference to FIGS. 6 and 7. FIG. 5 shows an example where HD (High Density) movie contents are recorded.

Further, the details of playlists 221-1 to 221-3, clip data items 231-1 to 231-3, AV streams 232-1 to 232-3, files 251-1 and 251-2, and files 261-1 and 261-2 that are shown in FIG. 6 are the same as those of the playlists 113-1 to 113-3, the clip data items 121-1 to 121-3, the AV streams 131-1 to 131-3, the files 161-1 and 161-2, and the files 171-1 and 171-2 that are shown in FIG. 4. Therefore, the description thereof is omitted, as appropriate.

There are two layers including reproduction programs 211-1 and 211-2 (movie objects) and titles 201 and 202 above the clip data 231 and the playlist 221 that were described with reference to FIG. 6. The reproduction program 211 (the movie object) provides functions required for presenting the HD movie contents in a programmable manner, where the functions includes, for example, specifying a playlist for reproduction, responding to the user's operation, jumping between the titles 201 and 202, branching a reproduction sequence, and so forth.

The titles 201 and 202 are used, as an index that can be identified by the user and used for starting the content reproduction. The titles 201 and 202 are configured to specify a single movie object execution. Further, other than ordinary titles, a title that is automatically reproduced at the start and a title for displaying a menu may be provided.

Further, applis (application programs) 203 and 204 are used for executing a game and Web contents which are expanded applications. At that time, the reproduction programs (execution Objects) 212-1 and 212-2 are started and executed. The reproduction program 212 uses the playlist, as required. Further, in the case of the above-described application programs 203 and 204, the reproduction program 212 can arbitrarily refer to an image file 241, a speech file 242, and a data file 243.

The number of the titles 201 and 202 indicating the HD movie contents and the applications 202 and 203 can be increased. In FIG. 6, the increased titles and the applications are shown, as Other 205. Further, the titles and the applications can be recorded onto the recording medium 81, so as to be coresident with one another. FIG. 6 shows the state where the titles and the applications are coresident with one another.

In FIG. 6, the files are grouped as below according to the use-and-update frequency and the maximum total size of files included in a group, as is the case with FIG. 4. that is to say, the titles 201 and 202, the applis 203 and 204, the Other 205, the reproduction programs 211-1, 211-2, 212-1, and 212-2, and the playlists 221-1 to 221-3 are included in group A, the clip data 231 is included in group B, and the image file 241, the speech file 242, and the data file 243 are included in group C.

Further, the groups A, B, and C shown in FIG. 6 are divided and named for convenience, as is the case with the groups 1, 2, 3, and 4 shown in FIG. 4. The groups A, B, and C are configured in the same way as in the case of the groups 1, 2, 3, and 4, in a sense that each of the groups A, B, and C is a group of files to be processed.

FIG. 7 shows an example directory configuration of Blu-Ray Disc Movie (BDMV) information that is recorded onto the recording medium 81 and defined by Blu-Ray Disc ROM Format (BD-ROM). Further, a directory other than the above-described directories may be configured under the root directory, even though the directory is ignored by a BDMV-capable recorder/player.

The root directory includes a single directory, as shown in the above-described drawings.

"BDMV" includes the entire files defined by the BDMV application format and directories. Further, the "BDMV" directory includes directories described below.

A "PLAYLIST" directory includes database files of the playlist 221. The directory is set, even though no playlist 221 is provided.

A "CLIPINF" directory includes the databases of the clip. The directory is set, even though no clip is provided.

A "STREAM" directory includes the AV-stream files. The directory is set, even though no AV-stream file is provided.

A "BACKUP" directory includes backup files of the files classified under the groups A and/or B. The directory is set, even though no file classified under the group A or the group B is provided.

In FIG. 7, a "PLAYLIST" directory includes files 11111.mpls and 22222.mpls. The file indicated by "xxxxx.mpls" holds information relating to a single Movie PlayList and a single file is generated for each playlist. Here, the specifier "xxxxx" denotes five numbers, where each of the five numbers is zero to nine.

A "CLIPINF" directory holds the single file corresponding to each of the AV-stream files. In FIG. 7, files 01000.clpi and 02000.clpi are held.

A file indicated by "zzzzz.clpi" denotes the clip data 231 corresponding to a single AV stream 232. The file name is "zzzzz.clpi". Here, the specifier "zzzzz" denotes five numbers, where each of the five numbers is from zero to nine.

The "STREAM" directory holds the AV-stream files. In FIG. 7, files 01000.m2ts and 02000.m2ts are held.

A file indicated by "zzzzz.m2ts" is the file of the AV stream 232. The file name is "zzzzz.m2ts". Here, the specifier "zzzzz" denotes five numbers, where each of the five numbers is from zero to nine. Further, the same five numbers "zzzzz" are set for the file of a single AV stream 232 and the clip data 231 corresponding thereto, as the file name.

Further, Unit_Key_Gen_Value.inf and CPU_CCI.inf are held directly under the "BDMV" directory, as copy-control related files. Further, index.bdmv is held, as the file of a title-management table. Further, MovieObject.bdmv is held, as a reproducing-program management table.

Further, a "Resource" directory, a "DATA1" directory, and a "DATA2" directory are set directly under the "root" directory. Although the above-described directories are not indispensable for the Blu-Ray Disc ROM Format, they are added, as example directories for storing expanded data that may be required according to the details of contents. The "Resource" directory holds Image.jpg, Audio.pcm, and Jimaku.txt correspond to the image file 241, the speech file 242, and the file 243 that are grouped and managed. Further, the "DATA1" directory holds the File1.dat and File2.dat corresponding to the files 251-1 and 251-2. Further, the "DATA2" directory holds the FileA.dat, FileB.dat, and so forth corresponding to the files 261-1 and 261-2.

In files and directories that are managed under the directories shown in FIG. 7, the files Unit_Key_Gen_Value.inf, CPS CCI.inf, index.bdmv, and MovieObject.bdmv, and the files 11111.mpls and 22222.mpls held in the "PLAYLIST" directory are included in the group A, the files 01000.clpi and 02000.clpi held in the "CLIPINF" directory are included in the group B, and the files Image.jpg, Audio.pcm, and Jimaku.txt that are held in the "Resource" directory are included in the group C and held.

Further, other than the above-described files that are grouped and managed, the File1.dat and File2.dat corresponding to the files 251-1 and 251-2 held in the "DATA1" directory are grouped, as the group X.

Next, known steps of making access to a file in the case where the UDF is used will be described with reference to FIGS. 8 and 9 before the description of recording process according to the present invention is provided.

FIG. 8 shows an example Volume Structure configuration of the UDF and FIG. 9 shows the details of File Structure and Files. Here, example access to "root/BDMV/Unit_Key_Gen_Value.inf" shown in FIG. 9 will be described.

In FIG. 8, Volume Structure denotes recorded information related to logic Volume and information related to a point where the analysis of File Structure stored in a partition is started. Further, in FIG. 8, the left-most column shows LSN (Logical Sector Number), the second column from the left shows Structure, the second column from the right shows Descriptors, and the right-most column shows LBN (Logical Block Number). Further, in FIG. 9, the left-most column shows the LBN (Logical Block Number), the center column shows the Structure, and the right-most column shows the Descriptors.

The information about an address in the volume is indicated by the LSN (logical sector number) and an address in the partition is indicated by the LBN (logical block number). Further, where a plurality of the partitions is provided in the volume, a plurality of partition data items can be stored in Logical Volume Descriptor.

Further, as for FIGS. 8 and 9, only items necessary for performing processing will be described. The description of items unnecessary for the processing will be omitted, as appropriate.

First, anchor information (Anchor Volume Descriptor pointer) of Anchor-1 that is shown in FIG. 8 and that is indicated by number 1 at the position where the LSN is 256 is analyzed, and the position of Volume Descriptor Sequence indicated by number 2 is obtained. Then, Volume Descriptor Sequence that is indicated by number 2 at the position where the LSN is 32 to 47 is analyzed. The Volume Descriptor Sequence includes "Primary Volume Descriptor", "Implementation Use Volume Descriptor", "Partition Descriptor", "Logical Volume Descriptor", "Unallocated Space Descriptor", "Terminating Descriptor", and "trailing Logical Sectors". The "Primary Volume Descriptor" includes information for identifying volume, the "Implementation Use Volume Descriptor" includes information indicating compatibility, the "Partition Descriptor" includes information for identifying the partition, the "Logical Volume Descriptor" includes information indicating the position of a logical partition, the "Unallocated Space Descriptor" includes information indicating an unassigned area, the "Terminating Descriptor" includes information indicating the end position of an area, and the "Trailing Logical Sectors" includes information about a remaining area.

Of the above-described LSNs, the position of "Logical Volume Integrity Sequence" written in "Logical Volume Descriptor" that is indicated by number 3 shown in FIG. 8 at the position where LSN is 35, the position of a target partition, and the position of File Set Descriptor in the partition are acquired.

Further, "Logical Volume Integrity Sequence" that is indicated by number 4 at the position where LSN is 48 is analyzed and the consistency of the Volume information is confirmed. If the consistency presents no problem, the inside of the partition of File Structure and Files that are indicated by number 5 and that correspond to LSN 272 to 272 Nall to 272 is analyzed. By performing the above-described steps, it becomes possible to start making access to a target partition.

Next, the root information is stored in File Set Descriptor that is shown in FIG. 9 and indicated by number 11 at the position where LBN is (A+1). Subsequently, the root information is analyzed and the position of File Entry (indicated by FE (Root Directory) in this drawing) of Root Directory that is indicated by number 12 at the position where LBN is (A+3) is acquired.

Further, File Entry of a root directory (indicated by FE (Root Directory) in the drawing) that is indicated by number 12 at the position where LBN is (A+3) is analyzed and the position where the information about the root directory is written (LBN=A+4) is acquired. Next, FID (File Identifier Descriptor) in a BDMV directory that is indicated by number 13 and that is included in the root-directory information is analyzed, and the position of FE (File Entry) in the BDMV directory indicated by number 14 (indicated by FE (BDMV) in the drawing) (LBN=A+5) is acquired.

Further, File Entry in the BDMV directory indicated by number 14 is analyzed and the position where the information of the BDMV directory is recorded (LBN=A+9) is acquired.

Then, the BDMV-directory information is acquired and File Identifier Descriptor of Unit_Key_Gen_Value.inf in the BDMV directory indicated by number 15 is analyzed, and the position of File Entry of the Unit_Key_Gen_Value.inf is acquired. Further, File Entry of the Unit_Key_Gen_Value.inf indicated by number 16 is analyzed, the position where data on the Unit_Key_Gen_Value.inf is recorded is acquired, and access to an address where the data on the Unit_Key_Gen_Value.inf is recorded is made so that target data is acquired. By performing the above-described processing, data on a file "root/BDMV/Unit_Key_Gen_Value.inf" indicated by number 17 can be acquired.

Where a metadata partition introduced based on UDF2.50 is used, File Set Descriptor indicated by number 11, File Entry in Root Directory indicated by number 12, FID (File Identifier Descriptor) in the BDMV directory indicated by number 13, FE (File Entry) in the BDMV directory indicated by number 14, File Identifier Descriptor of Unit_Key_Gen_Value.inf in the BDMV directory indicated by number 15, and File Entry of Unit_Key_Gen_Value.inf indicated by number 16 are provided in the metadata partition by using virtual addresses.

The position where the metadata partition is recorded can be acquired by the file entry of the metadata file. By reading the data in the metadata partition into a memory at one time, it becomes possible to acquire and analyze information necessary for reading a file from the metadata-partition information read onto the memory without reading each of three information items including the File Identifier Descriptor, the File Entry, and the directory information from the recording medium every time the directory branches off, even though access is made to a file held under a directory having a plurality of layers.

Next, a method for placing file-system information items at virtual addresses will be described with reference to FIGS. 10 to 12.

The file-system information items are brought together and placed at a single position, as a metadata file, by using addresses on an ordinary physical partition used for a file system. Virtual addresses (address 0 is assigned to the partition head) are assigned in the metadata file and the file-system information items are configured in the metadata partition so that the file-system information refers to the virtual addresses.

Namely, it becomes possible to trace (read) information described in FIG. 9 by using the virtual addresses in the metadata file, where the information includes File Set Descriptor indicated by number 11, File Entry in the Root Directory indicated by number 12, FID (File Identifier Descriptor) in BDMV directory indicated by number 13, FE (File Entry) in BDMV directory indicated by number 14, File Identifier Descriptor of Unit_Key_Gen_Value.inf in BDMV directory indicated by number 15, and File Entry of Unit_Key_Gen_Value.inf indicated by number 16.

In an upper section of FIG. 10, MD File FE (Metadata File File-Entry) is described in an area B11, so that it becomes possible to trace file-system information (FS) stored in an area B12 based on the description. Namely, the MD File FE in the area B12 shows that the file-system information (FS) is stored in the area B11 which is an area provided in a physical partition at addresses A to A+X. Further, as shown in a lower section of FIG. 10, the above-described file-system information (FS) is written in an area P1 in the metadata partition at virtual addresses 0 to X.

Further, the metadata partition may be provided in at least two areas in the physical partition. For example, where the metadata partition is provided at two positions corresponding to an area B23 in the physical partition at the addresses A to A+X and addresses B to B+Y in the physical partition, as shown in an upper section of FIG. 11, file-system information is stored at two positions corresponding to the area B23 in the physical partition at the addresses A to A+X and an area B22 in the physical partition at the addresses B to B+Y, in MD File FE in the area B21. Further, as shown in a lower section of FIG. 11, file-system information is stored in an area P2 in the metadata partition at the virtual addresses 0 to X+Y.

Further, two metadata files may be provided (two identical metadata files (FS) are provided, as a function used by UDF2.50 (one of the files is referred to as a main-metadata file (=main FS) and the other file is referred to as a mirror metadata file (mirror FS)), so as to increase the reliability of the file-system information.

Namely, where a (main) metadata file which is file-system information is provided in an area B32 in the physical partition at addresses A to A+X and a mirror metadata file which is file-system information is provided in an area B34 in the physical partition at addresses B to B+Y, MD file FE of the area B31 shows that the metadata file is stored in the area B32 in the physical partition at the addresses A to A+X. Then, the file-system information is stored in an area P3 in the metadata partition at the virtual addresses 0 to X, as the (main) metadata file, as shown in a lower section of FIG. 12. Similarly, at that time, MDM File FE in an area B33 shows that the mirror metadata file is stored in an area B34 in the physical partition at the addresses B to B+X. Further, as is the case with the above-described main metadata file, the file-system information is stored, as the mirror metadata file, in the area P3 in the metadata partition at the virtual addresses 0 to X, as shown in the lower section of FIG. 12. Thus, the reliability of the file-system information can be increased by writing the identical metadata files.

Next, a recording method used when the recording medium 81 is the BD-R will be described with reference to FIG. 13. The recording method used for the BD-R includes sequential recording mode and random recording mode.

The sequential recording mode allows recording information in sequence in a predetermined direction from the position at which recording information onto the recording medium is started (usually, the center position of a disc in the case where a disk-shaped recording medium is used). On the other hand, the random recording mode allows recording information by randomly setting positions on the recording medium. Where the disk-shaped recording medium is used, the sequential recording mode allows recording information according to its context more faithfully than in the case of the random recording mode, so that the read speed increases. Hereinafter, therefore, the sequential recording mode is used for recording information. However, in another embodiment of the present invention, the random recording mode may be used, as the mode in which information is recorded onto the recording medium, without being limited to the sequential recording mode.

FIG. 13 schematically shows the sequential recording mode, as one of the BD-R recording modes.

The information recorded onto the BD-R is recorded in units of Session. Although two sessions shown as Sessions 1 and 2 are written in FIG. 13, two or more sessions may be written. The session includes at least one SRR (Sequential Recording Range). Although multiple sessions may be set, only the last session can store information.

The SRR (Sequential Recording Range) includes a plurality of clusters (64 KB), where the cluster is the minimum unit of information recorded onto the BD-R. The SRR is the record unit corresponding to a track of a CD-R (Compact Disc-Recordable) medium. Further, the SRR has two modes including Open mode and Closed mode. The SRR is recordable in the Open mode. When recording is finished and the SRR enters the Closed mode, the SRR becomes non-recordable. Further, a maximum of sixteen sessions can be set to the Open mode. Further, a maximum of about seven thousand six hundred SRRs can be set in a single BD-R. In FIG. 13, SRRs #1 to #5 are set, and it is indicated that information had already been recorded in areas 281-1 to 281-4 of the SRRs #1 to #4 (shown as recorded). Further, LRA (Last Recorded Address) is written at the end of each of the areas 281-1 to 281-4, so as to show that the end corresponds to a final record position. Further, in FIG. 13, SRRs #3 to #5 are in the Open mode and the other SRRs are in the Closed state. Therefore, the position immediately after the LRA in each of the SRRs #3 and #5 is NWA (Next Writable Address) where new recording is started.

Next, write processing for writing information onto the recording medium 81 performed by the recording-and-reproducing mechanism 22 shown in FIG. 3 will be described with reference to a flowchart of FIG. 14.

At step S1, the control unit 51 determines whether or not file recording was requested and keeps performing the processing until the CPU 11 requests the file recording. For example, at step S1, upon receiving an instruction to record file transmitted from the CPU 11, the control unit 51 determines that it is instructed to record a file and advances processing to step S2.

At step S2, the file-system-information identification unit 61 controls the reproduce unit 54 and makes the recording-and-reproducing block 53 detect the position where the LRA is recorded from among the information stored in the recording medium 81.

At step S3, the control unit 51 makes the recording-and-reproducing block 53 start writing data transmitted to the write unit 73 from the position immediately after the LRA via the ECC encoding unit 71 and the modulation unit 72, based on the detected LRA position.

Namely, where information is recorded onto the recording medium 81 in the state shown in an upper section of FIG. 15, for example, the control unit 51 controls the file-system-information identification unit 61, thereby detecting a record-end-position LRA (old) of data that was recorded immediately before (Previous Recording) and controls the file-system-information generation unit 62, so as to set a new SRR (Open) from the position immediately after the LRA (Old) and start recording data (an area indicated by Current Recording in the drawing).

At step S4, the control unit 51 determines whether or not the monitor unit 55 detected a record error. For example, where the monitor unit 55 detects an error in a signal transmitted from the write unit 73, or the recording-and-reproducing block 53 detects a tracking-deviation error, at step S4, it is determined that the record error occurred. Subsequently, the control unit 51 is informed of the record-error occurrence and information about the position where the record error occurred on the recording medium 81. As a result, in the above-described case, the control unit 51 determines that the record error occurred and advances processing to step S5.

At step S5, the file-system-information generation unit 62 reads the current address, that is, the position where the record error occurs and generates an extent from the address where the recording is started. That is to say, where data recording is started at the position immediately after the LRA (old), as shown in an upper section of FIG. 15, the file-system-information generation unit 62 sets the extent over a range from the position immediately after the LRA (old) to the position corresponding to information about the position on the recording medium 81 (position P0 shown in FIG. 15), where the position information is transmitted with record-error-occurrence information transmitted from the monitor unit 55, as shown in a lower section of FIG. 15.

At step S6, the control unit 51 controls the write unit 73 so that the record position is made to jump from the current address, that is, the position where the record error occurs on the recording medium 81, to a position away therefrom by as much as a predetermined distance (e.g., about several to several tens of MB). That is, the record position is made to jump from position P0 to position P1, as shown in the lower section of FIG. 15.

At step S7, the file-system-information generation unit 62 registers a range from the position where the record error occurred on the recording medium 81 to a position immediately before the position where recording is started after the record position is made to jump, as a defect sector. That is to say, as shown in the lower section of FIG. 15, the file-system-information generation unit 62 registers the address of a range (part indicated by oblique lines in FIG. 15) from the position P0 where the error was detected to a position immediately before the position P1 where the recording is started with so-called Defect List (defect-sector-position registration list) so that the range is registered, as a defect sector and a range in which writing and/or reading data is prohibited of the recording area on the recording medium 81. Then, the file-system-information generation unit 62 controls the write unit 73 so that the recording-and-reproducing block 53 stores the prohibition-range information on the recording medium 81.

On the other hand, where it is determined that no record error is detected, at step S4, the processing corresponding to steps S5 to S7 is skipped.

At step S8, the control unit 51 determines whether or not the recording was finished, namely, whether or not the entire data of the requested file was recorded. Where it is determined that the recording is not finished, the processing returns to step S4 and the processing at step S4 on down is performed again. That is to say, the processing corresponding to steps S4 to S8 is performed repeatedly until the recording is finished.

Then, where it is determined that the recording was finished, at step S8, the file-system-information generation unit 62 generates an extent based on the address corresponding to the position where the recording was finished and the address corresponding to the position where the previous recording was started, at step S9. Further, where the record position is made to jump during the above-described processing is performed, the file-system-information generation unit 62 determines a range from the position where the recording was started after the jump to the position where the recording was finished to be an extent.

At step S10, the file-system-information generation unit 62 updates the file-system information FS by using an FE recorded based on the generated extent and stores the updated file-system-information FS.

At step S11, the file-system-information generation unit 62 updates and stores the LRA information. Then, the processing returns to step S1, whereby the processing from step S1 on down is performed again.

That is to say, at step S9, the file-system-information generation unit 62 generates the extent based on the address corresponding to the position where the recording was finished (the position corresponding to LRA (new) shown in the drawing) and the address of the position P1 where the previous recording was started, as shown in the lower section of FIG. 15.

Further, at step S10, the FS is updated based on the generated extent corresponding to the range from the LRA (old) to the position P0 and an FE storing the extent corresponding to a range from the position P1 to the LRA (new), as shown in the lower section of FIG. 15, for example.

At step S11, the file-system-information generation unit 62 updates the LRA. Namely, the file-system-information generation unit 62 updates the LRA by recording the LRA (new) at the position where recording was finished, as shown in the lower section of FIG. 15. Then, the processing returns to step S1 and the processing from step S1 on down is performed again.

By performing the above-described processing, the extent is closed at the position where the record error occurs and the record area is made to jump so that new data recording is started. Subsequently, since the recorded data corresponds to only the range set by the extent, the area where the record error was detected is not read. As a result, it becomes possible to reduce errors during the data is reproduced.

Next, the processing for reading data recorded onto the recording medium 81 performed by the recording-and-reproducing mechanism 22 shown in FIG. 3 will be described with reference to a flowchart shown in FIG. 16.

The control unit 51 determines whether or not file reading was requested, at step S21, and keeps performing the processing until the CPU 11 requests the file reading. For example, at step S21, where an instruction to read a file is transmitted from the CPU 11, the control unit 51 determines that it is instructed to read the file and advances processing to step S22.

At step S22, the file-system-information identification unit 61 controls the read unit 91 of the reproduce unit 54 and makes the recording-and-reproducing block 53 read the FS stored in the recording medium 81.

At step S23, the control unit 51 reads the FE of a file specified to be read of the read FSs. Further, the control unit 51 extracts extents stored in the FE, at step S24. Namely, the above-described processing allows extracting the position where the file specified to be read is recorded on the recording medium 81.

At step S25, the control unit 51 selects an extent from which no data is read among the extents extracted at step S24.

At step S26, the control unit 51 controls the read unit 91 and sets a read address AD on the recording medium 81 to a head address AD0 of the selected extent.

At step S27, the control unit 51 determines whether or not the set read address AD corresponds to a position exceeding the LRA in the SRR. Namely, even though a plurality of the extents can be set in the SRR, data is not recorded in an area extending beyond the position where the LRA is recorded, that is to say, data from the position on down is stored in the next SRR (stored in the next extent). Therefore, at step S27, where the set read address AD corresponds to a position exceeding the LRA, the processing returns to step S25 so that a new extent from which no data is read is selected.

Where it is determined that the set read address AD does not exceed the LRA in the SRR, at step S27, the control unit 51 determines whether or not the set read address AD is at a position set in the defect sector, at step S28. That is to say, the control unit 51 reads the information of Defect List from the information stored in the recording medium 81 and determines whether or not the position that is currently set, as the read address AD, is the position registered, as the defect sector and a position where data reading and/or data writing is prohibited. For example, where it is determined that the set read address AD is not the position registered as the defect sector, at step S28, the control unit 51 controls and makes the read unit 91 read the data recorded onto the recording medium 81, where the data corresponds to the set read address AD, at step S29. On the other hand, where the read address AD is determined to be the defect sector, at step S28, the processing corresponding to step S29 is skipped. Namely, where the read address AD is the defect sector, the control unit 51 controls the read unit 91 so that the data at the position is not read, since data writing and/or data reading is prohibited.

At step S30, the control unit 51 determines whether or not the read address is an address indicating the position where the range of the selected extent ends. Where it is determined that the read address is not the address of the end position, for example, the read address AD is incremented by one, at step S31, and the processing returns to step S27. That is to say, the processing at steps S27 to S31 is performed repeatedly until the entire data in a range specified by the selected extent is read.

Where it is determined that the entire data in the range specified by the selected extent is read, at step S30, the control unit 51 determines whether or not extents included in the FE corresponding to a specified file includes an extent from which no data is read, at step S32. Where it is determined that the extent from which no data is read exists, for example, the processing returns to step S25. Namely, the processing corresponding to steps S25 to S32 is performed repeatedly until data on the entire extents in the FE of the file specified to be read is read.

Then, if it is determined that the data on the entire extents in the FE of the file specified to be read is read, at step S32, the file is reconstructed based on the entire data read from each of the extents generating the specified file. Then, the processing returns to step S21 so that the processing from step S21 on down is performed again.

The read processing is executed in the above-described manner. Subsequently, where the record position is made to jump from the position where the record error occurred by as much as a predetermined distance, a new extent is set, and data is recorded by performing the write processing described with reference to the flowchart of FIG. 14, the position where the record error occurred on the recording medium 81 is not read, since the position corresponds to the position registered, as the defect sector. As a result, data stored in an inappropriate state due to a record error or the like is not read during the read processing is performed. Subsequently, it becomes possible to reduce errors that occur due to the read processing.

In the above-described embodiment, where the record error is detected, the extent is closed in the area extending to the position immediately before the position where the record error was detected, the record position is made to jump from the position where the record error was detected by as much as the predetermined distance, the new extent is generated, and a distance from the position where the record error was detected to the position immediately before the position where data recording is started, where the distance corresponds to the new extent, is registered, as the defect sector. Subsequently, the data recorded in the inappropriate state is not read, whereby the error occurrence during the read processing is performed is reduced.

According to the above-described example, however, the need for updating the registered information of the defect sector arises every time a record error occurs (the need for making an area non-recordable, the area storing data including the registered information about defect sectors in the past, and storing registered information about a new defect sector in a new record area arises, every time a defect sector is registered), which wastes the record area of the recording medium 81.

Therefore, where a record error is detected, instead of registering the area from the position where the record error was detected to the position where recording is started, as a defect sector, the LRA is updated at the position where the record error was detected, the SRR is closed, a new SRR is set at a position away from the above-described position by as much as a predetermined position, and the newly set SRR is opened so that data can be stored therein.

FIG. 17 illustrates the configuration of the recording-and-reproducing mechanism 22 that updates the LRA at the position where the record error was detected, closes the extent, sets the new SRR at the position away therefrom by as much as the predetermined distance, opens the newly set SRR so that the data can be stored therein. Further, in the recording-and-reproducing mechanism 22 shown in FIG. 17, the configuration corresponding to that of the recording-and-reproducing mechanism 22 shown in FIG. 3 is designated by the same reference numerals and characters as those in FIG. 3 and the description thereof is omitted, as appropriate.

The configuration of the recording-and-reproducing mechanism 22 shown in FIG. 3 is different from that of the recording-and-reproducing mechanism 22 shown in FIG. 3 in that a control unit 101 is provided in place of the control unit 51, and a file-system-information identification unit 111 and a file-system-information generation unit 112 are provided in place of the file-system-information identification unit 61 and the file-system-information generation unit 62. Further, the file-system-information generation unit 112 includes a memory 112*a*.

Basically, the control unit 101 has the same function as that of the control unit 51. However, the control unit 101 is different from the control unit 51 in that it stops recording when a record error is detected. Further, when the record error is detected, the file-system-information generation unit 112 updates the LRA at the position where the record error was detected, closes the extent, sets a new SRR at a position away therefrom by as much as a predetermined distance, opens the newly set SRR (a newly set extent) so that data can be stored therein instead of registering the range from the position where the record error was detected to the position where recording is started, as the defect sector, where the range corresponds to a new extent. At that time, the file-system-information generation unit 112 stores the change information of the SRR in the memory 112*a* and stores the update information of the SRR in the recording medium 81 at a later time (any time in a time period until the recording medium 81 is taken out of the recording-and-reproducing block 53). The file-system-information identification unit 111 is the same as the file-system-information identification unit 61.

Next, write processing for writing information onto the recording medium 81 performed by the recording-and-reproducing mechanism 22 shown in FIG. 17 will be described with reference to a flowchart of FIG. 18. Here, the description of processing at steps S41 to S44 and steps S52 to S55 shown in the flowchart of FIG. 18 is omitted, since the processing is the same as the processing at steps S1 to S4 and steps S8 to S11.

At step S45, the control unit 101 controls the write unit 73 and makes the recording-and-reproducing block 53 stop recording data onto the recording medium 81.

At step S46, the file-system-information generation unit 112 reads the current address, that is, the position where the record error occurred and generates an extent extending from the address where the recording is started. That is to say, where data recording is started at the position immediately after the LRA (old), as shown in an upper section of FIG. 19 (as is the case with the upper section of FIG. 15), the file-system-information generation unit 112 generates an extent over a range from the position immediately after the LRA (old) to the position corresponding to information about the position on the recording medium 81 (position P0 shown in a lower section of FIG. 19), where the position information is transmitted from the monitor unit 55 with record-error-occurrence information, as shown in the lower section of FIG. 19.

The file-system-information generation unit 112 updates the LRA, at step S47. Namely, the LRA (P0) is updated at the position P0 where the recording was finished, as shown in the lower section of FIG. 19.

At step S48, the control unit 101 controls the write unit 73 so that the record position is made to jump from the current address, that is, the position where the record error occurs on the recording medium 81, to a position away therefrom by as much as a predetermined distance (e.g., about several to several tens of MB). That is, the control unit 101 makes the record position jump from the position P0 to the position P11, as shown in the lower section of FIG. 19.

At step S49, the file-system-information generation unit 112 closes the SRR. Namely, for example, the file-system-information generation unit 112 closes the SRR extending from the LRA (old) (makes the SRR non-recordable), at the position P11, as shown in the lower section of FIG. 19.

At step S50, the file-system-information generation unit 112 opens the newly set SRR and stores information about the updated SRR in the memory 112*a*. Namely, for example, the file-system-information generation unit 112 generates a new SRR extending from the position P11 and opens the new SRR so that the SRR becomes recordable (enters the recordable state), as shown in FIG. 19.

At step S51, the control unit 101 controls the write unit 73 so that data recording is started from the head position of the new SRR to which the record position was made to jump (recording that was temporarily stopped is continued). Namely, the control unit 101 controls the write unit 73 so that data recording is started from the position P11 that is the position to which the record position was made to jump and that is the head position of the new SRR, as shown in the lower section of FIG. 19 (continues the temporarily stopped recording by performing processing at step S45).

Further, after the LRA is updated, at step S55, the file-system-information generation unit 112 determines whether or not the updated SRR information is stored in the memory 112a, at step S56. Namely, when the record error is detected and the new SRR is set through the processing corresponding to step S50, the updated SRR information is stored. In that case, the file-system-information generation unit 112 determines that the updated SRR information is stored and advances processing to step S57.

At step S57, the file-system-information generation unit 112 controls the write unit 73 so that the updated SRR information stored in the memory 112a is stored in the recording medium 81. Then, the processing returns to step S41 and the processing from step S41 on down is performed again.

Further, where it is determined that the updated SRR information is not stored, at step S56, the processing at step S57 is skipped.

Further, the read processing performed by the recording-and-reproducing mechanism 22 shown in FIG. 17 will not be described, since the read processing is the same as that performed by the recording-and-reproducing mechanism 22 that is shown in FIG. 3 and that was described with reference to the flowchart of FIG. 16.

That is to say, by performing the above-described processing, the data recording is stopped at the position P0 where the record error was detected, the LRA is updated, the record position is made to jump by as much as the predetermined distance, the new SRR is set at the position P11, and the data recording is continued, as the new extent, as shown in the lower section of FIG. 19. Therefore, the range from the position where the record error was detected to the position where the new data recording is started (the range from the position P0 to the position P11 shown in the lower section of FIG. 19) is not recorded, as the defect sector. However, according to the read processing illustrated in FIG. 16, when the read address AD exceeds the LRA in the SRR, the read position is changed to the next extent. Subsequently, if a range in which a record error may occur is not registered, as a defect sector, the range is not read. Further, data including defect sectors is not updated every time a record error occurs (there is no need to make the position at which the data including the defect sectors that occurred in the past is recorded non-readable and store data including a new defect sector in a new range), which prevents the record area on the recording medium 81 from being wasted. Further, since data reading from the range in which a record error may occur is reduced, only data stored in an adequate manner is read correctly. Subsequently, it becomes possible to reduce the occurrence of an error during the read processing is performed.

The above-described series of processing procedures can be executed not only by hardware but also by software. Where the series of processing procedures is executed by the software, a program included in the software is installed from a recording medium onto a computer provided in special-purpose hardware, or a computer that can perform various functions by using various programs installed thereon, such as a general-purpose personal computer.

The recording medium storing the program includes not only a packaged medium including the magnetic disk 41 (including a flexible disk), the optical disk 42 (including a CD-ROM (Compact Disc-Read Only Memory) and a DVD (Digital Versatile Disk)), the magneto-optical disk 43 (including an MD (Mini-Disc)), and the semiconductor memory 44, where the packaged medium includes the program and that is distributed to the user separately from the computer for providing the user with the program, but also the ROM 12 storing the program and a hard disk provided in the storage unit 18 that are included in the computer, so as to be provided to the user.

Further, in this specification, steps illustrating the program stored in the recording medium include not only processing executed in time sequence according to the written order but also processing that is not necessarily executed in time sequence but can be executed in parallel and/or separately.

BRIEF DESCRIPTION OF THE DRAWINGS

FIG. 8 shows procedures for making access to a file based on UDF.

FIG. 9 also shows procedures for making access to the file based on the UDF.

REFERENCE NUMERALS

Figure 1:
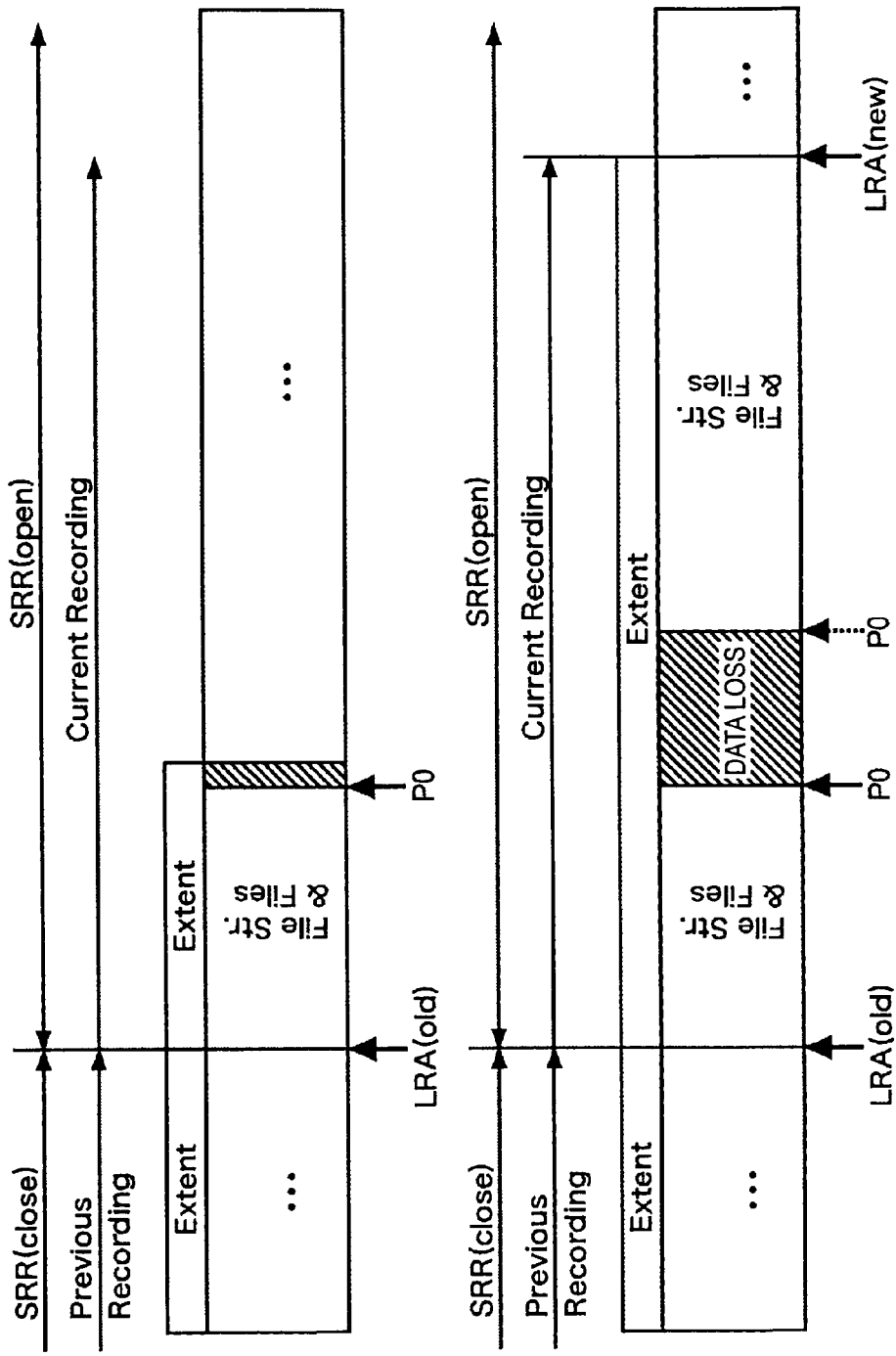
FIG. 1 illustrates known processing performed when a record error occurs.
Figure 2:
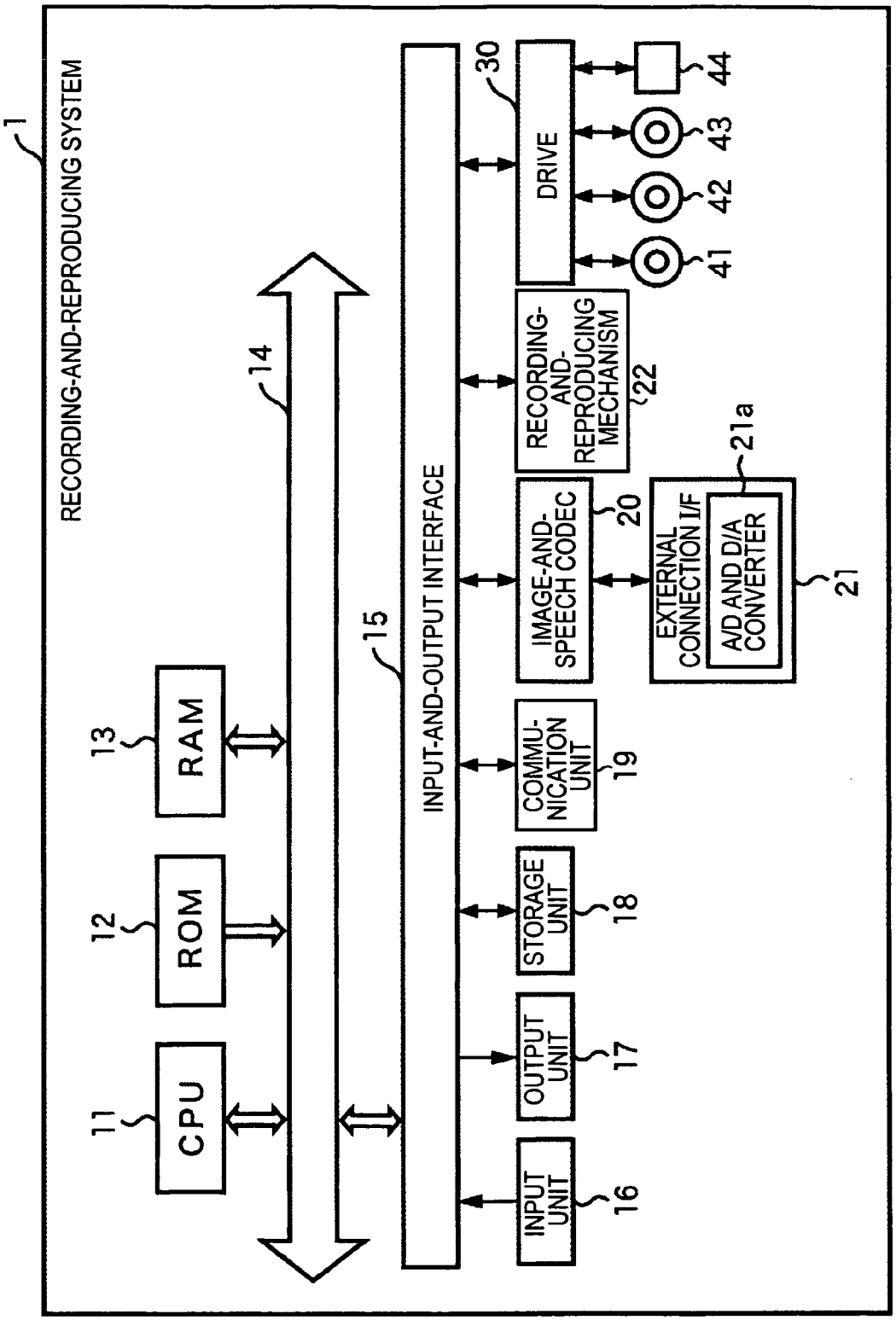
FIG. 2 shows the configuration of a recording-and-reproducing system according to an embodiment of the present invention.
Figure 3:
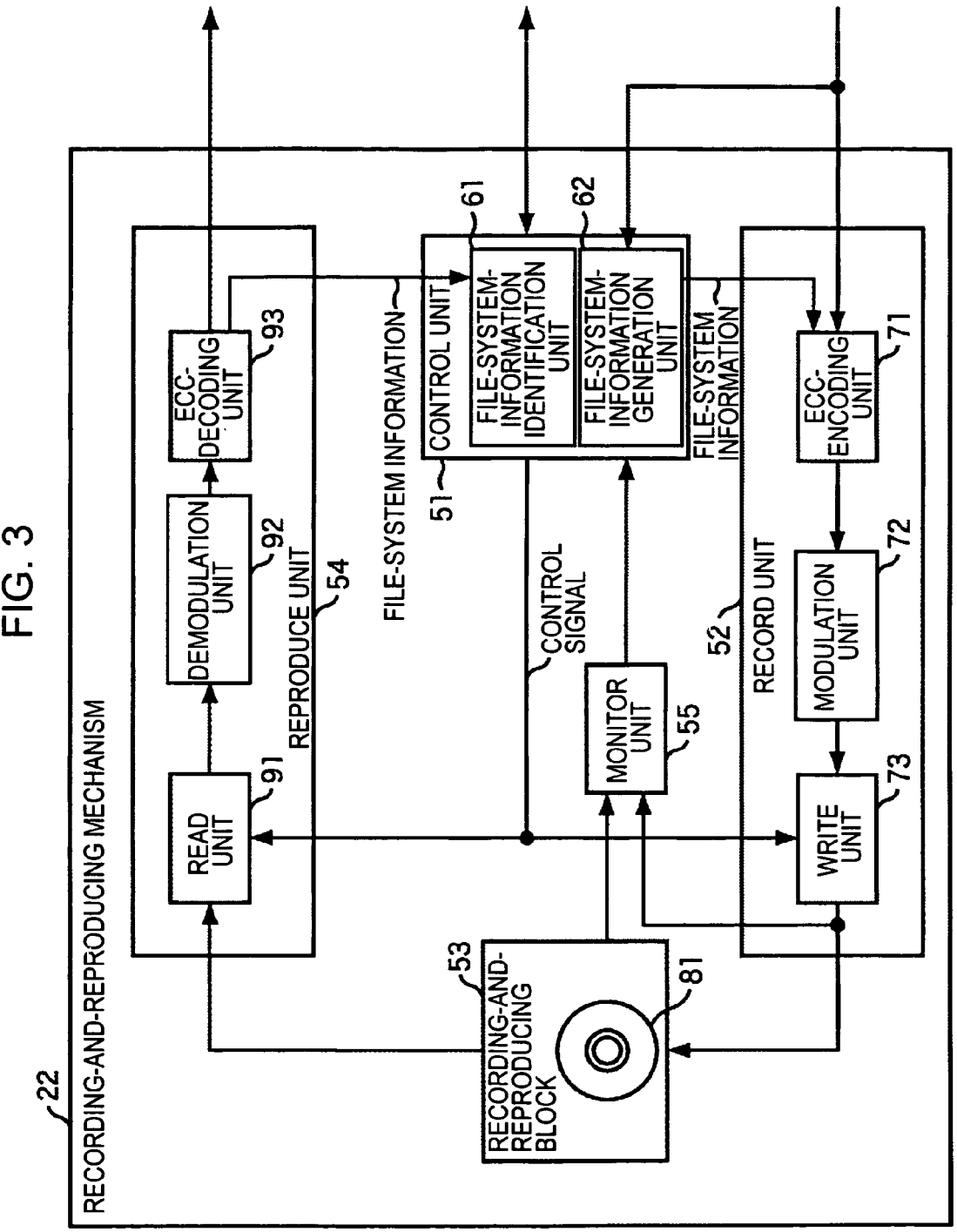
FIG. 3 shows the configuration of a recording-and-reproducing mechanism shown in FIG. 2.
Figure 4:
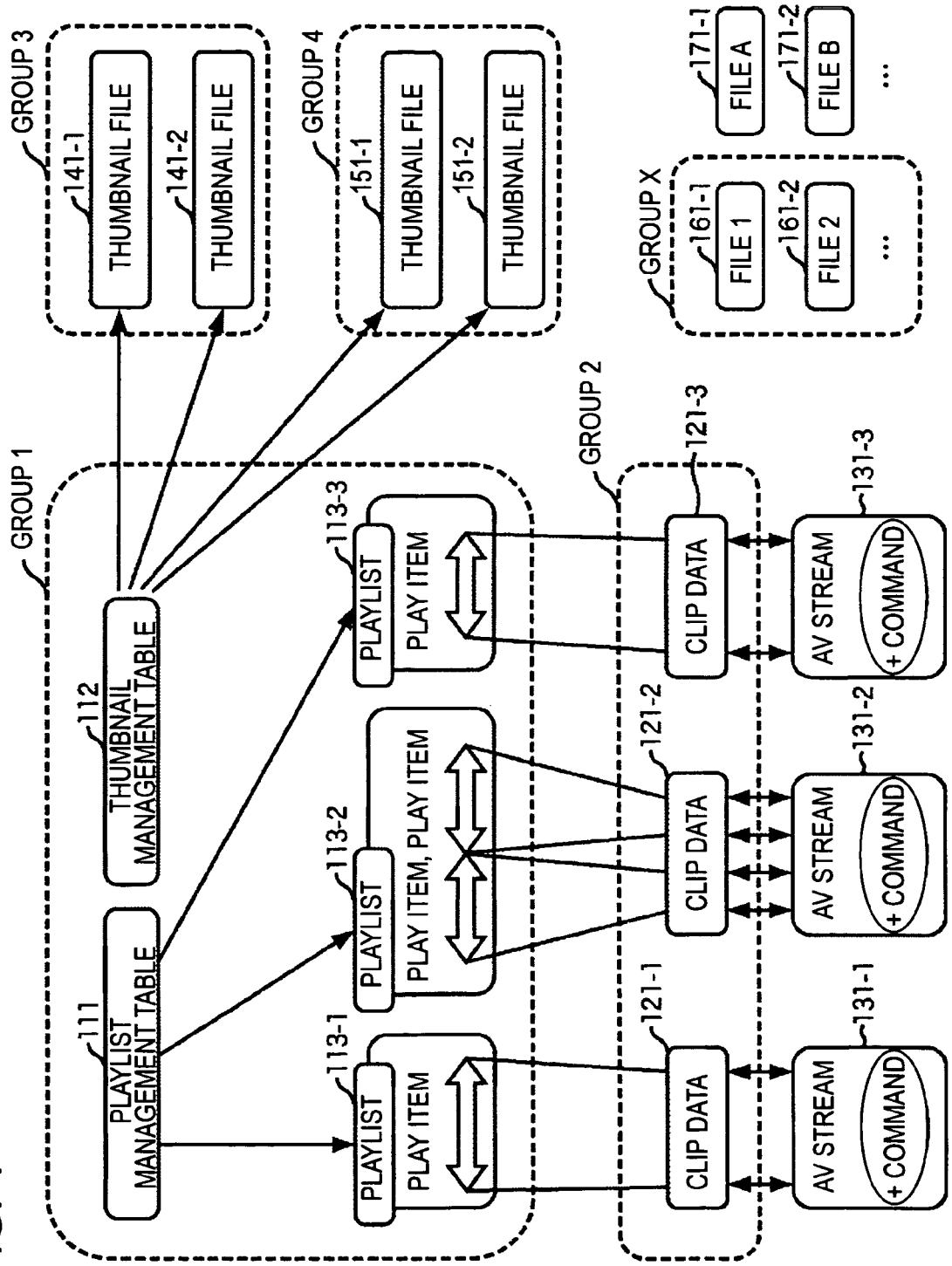
FIG. 4 shows example group management.
Figure 5:
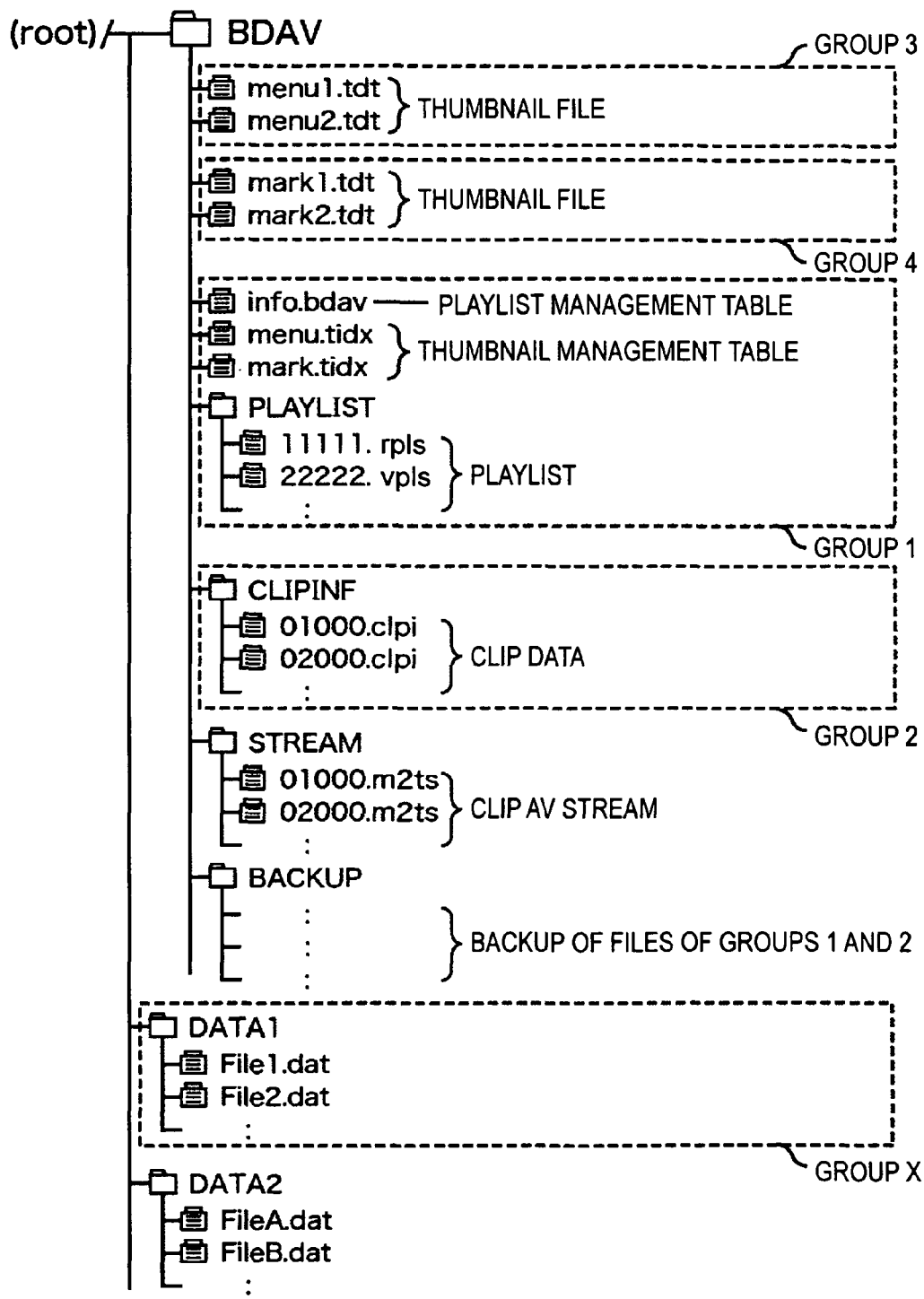
FIG. 5 shows the configurations of directories and files generated by the group management shown in FIG. 4.
Figure 6:
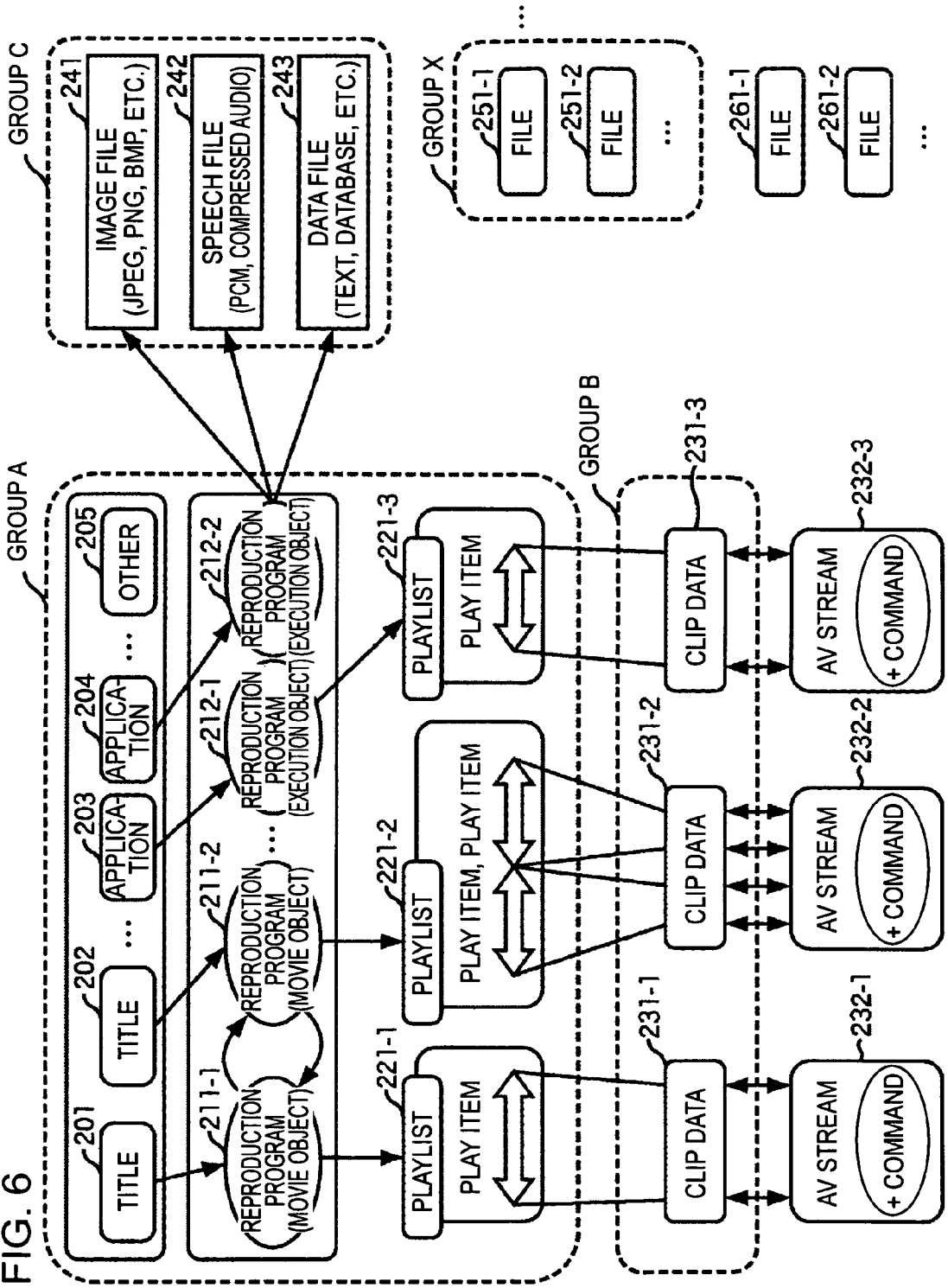
FIG. 6 shows other example group management.
Figure 7:
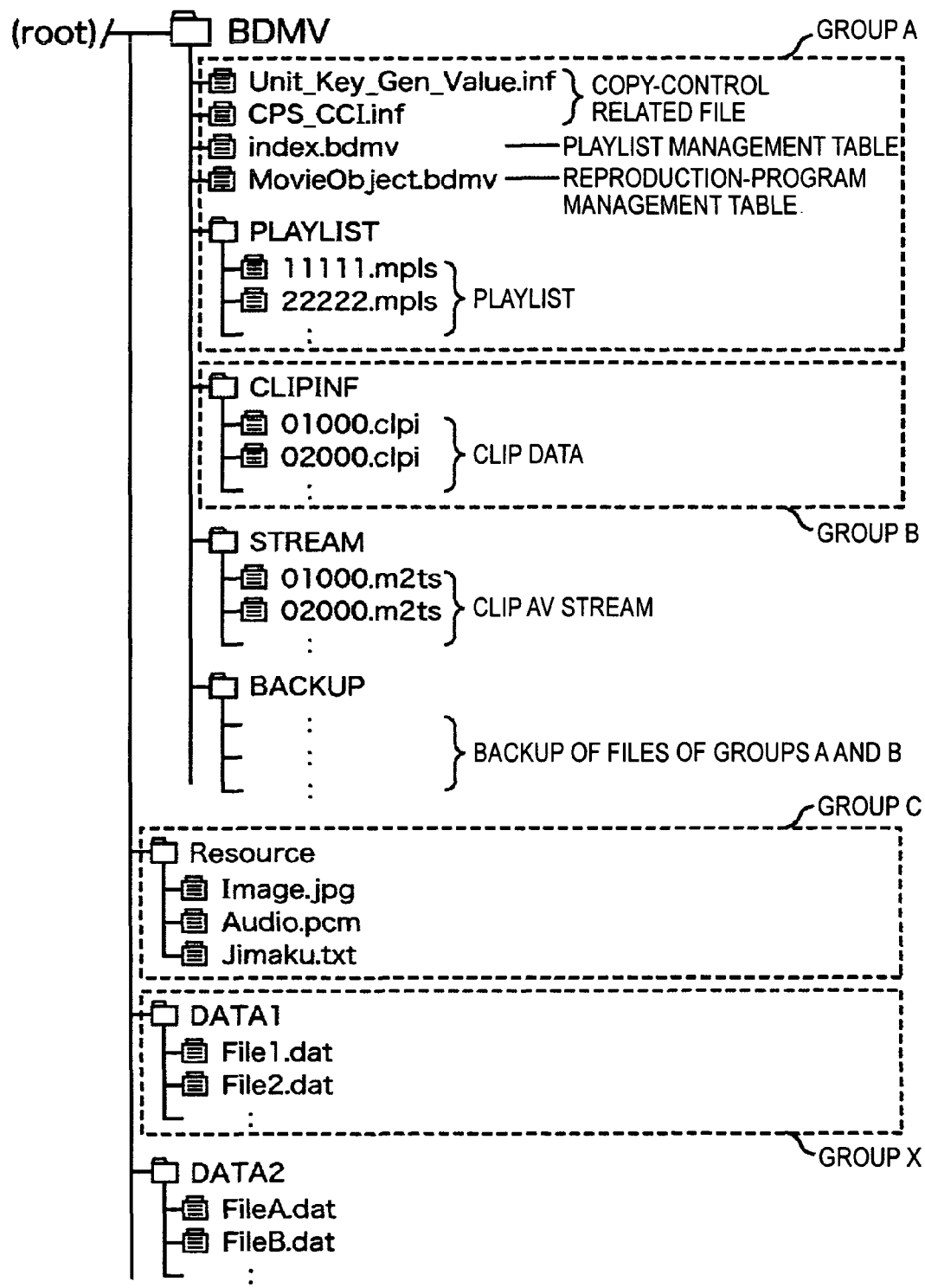
FIG. 7 shows the configurations of directories and files generated by the group management shown in FIG. 6.
Figure 10:
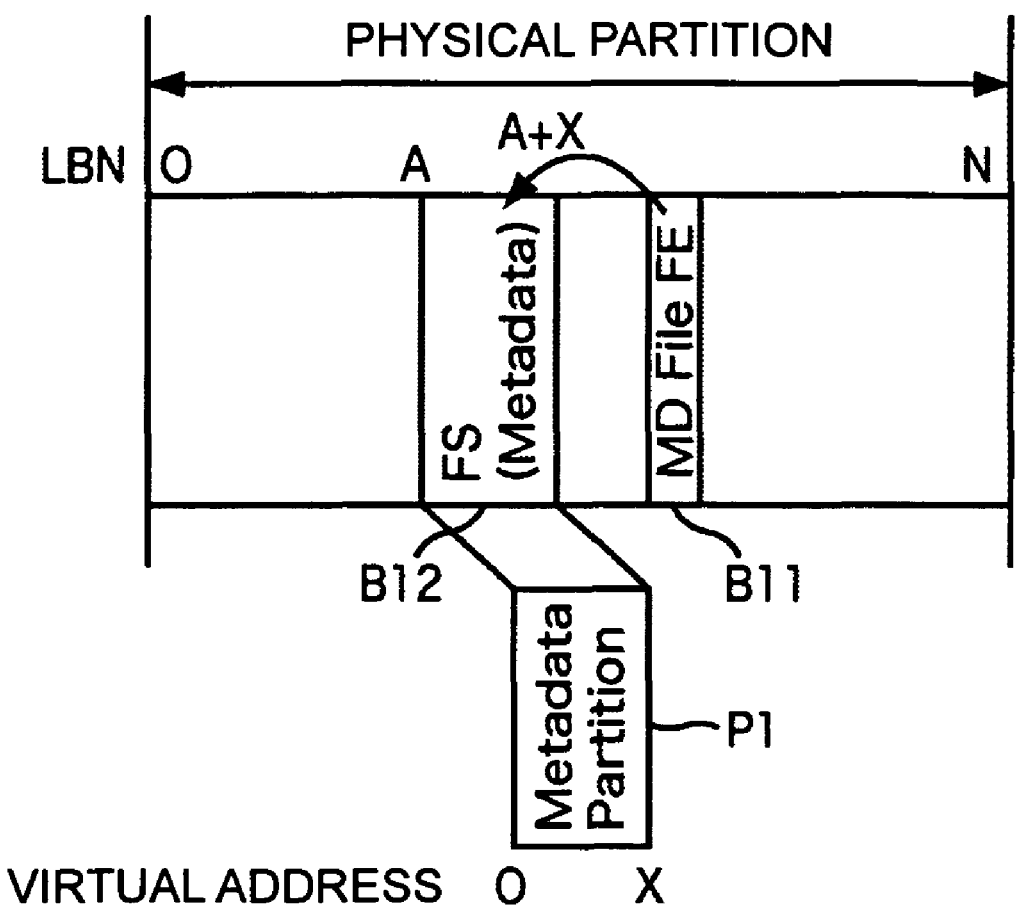
FIG. 10 illustrates a method for placing file-system information at a virtual address.
Figure 11:
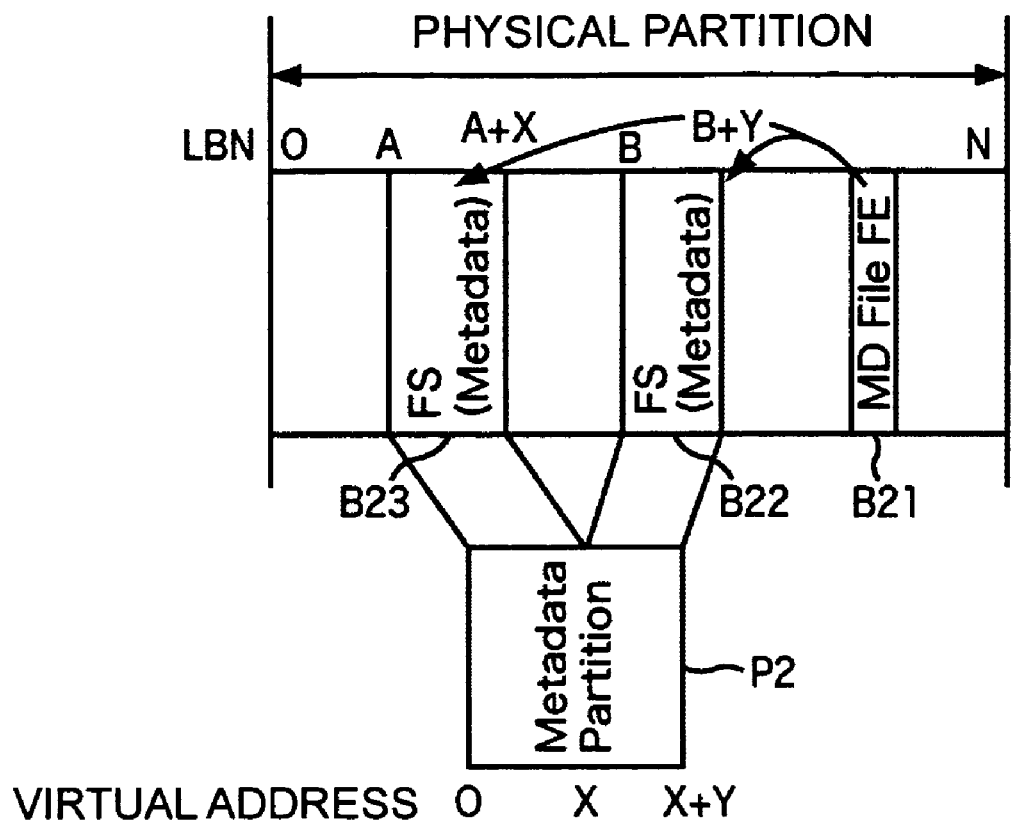
FIG. 11 also illustrates the method for placing the file-system information at the virtual address.
Figure 12:
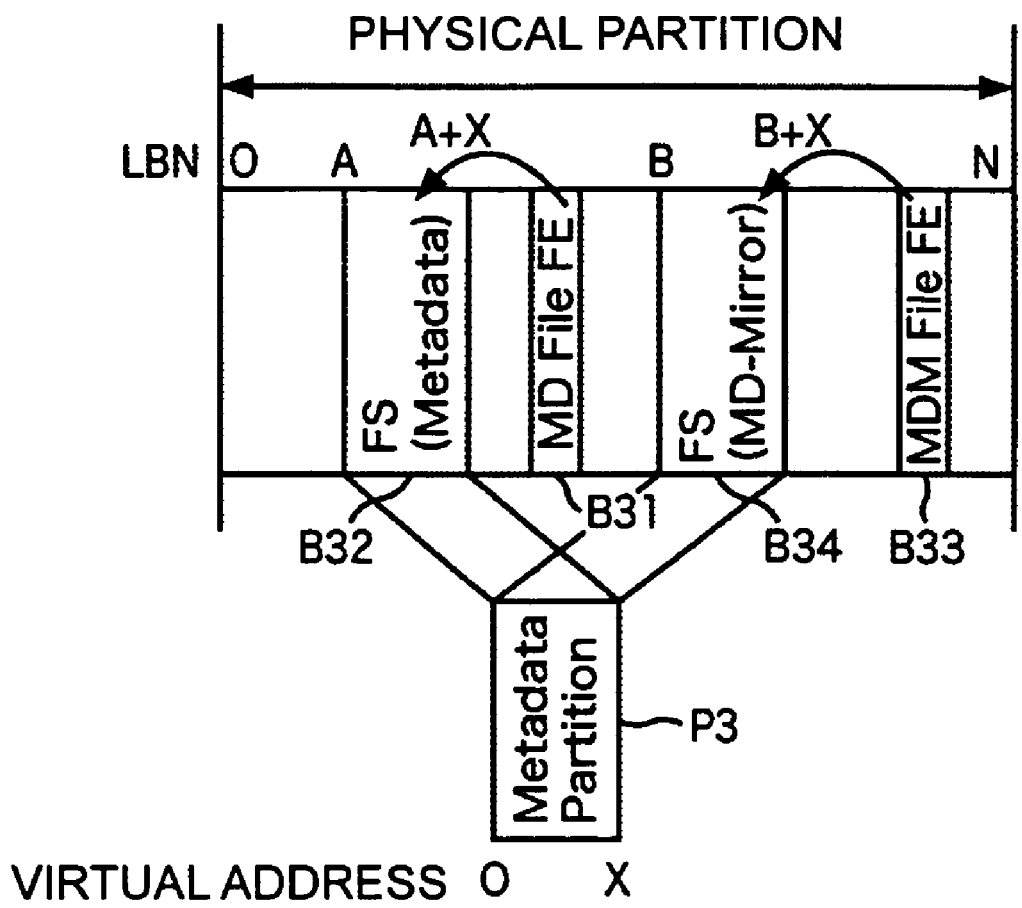
FIG. 12 also illustrates the method for placing the file-system information at the virtual address.
Figure 13:
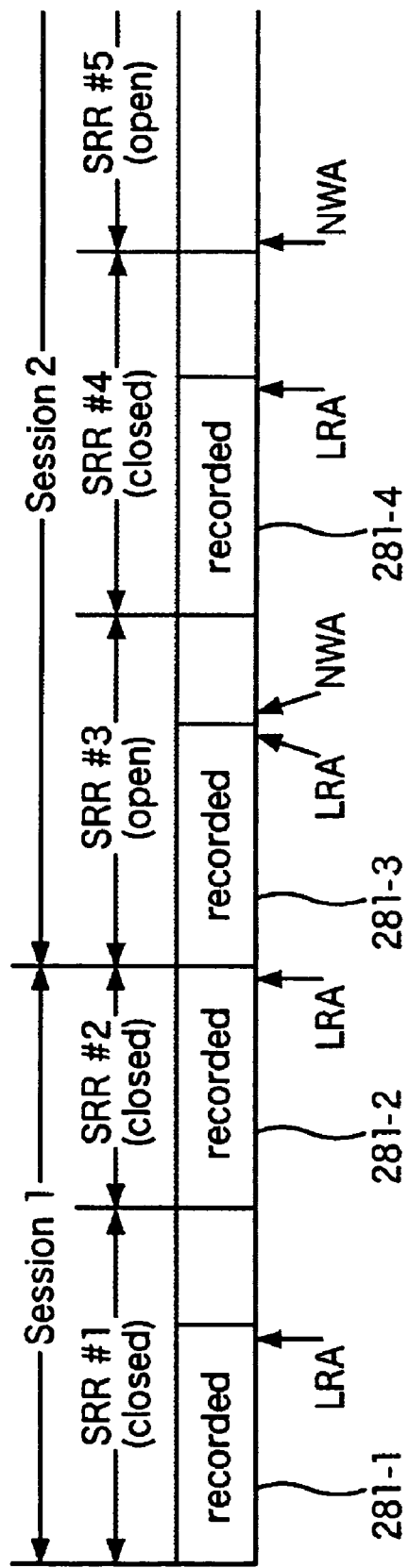
FIG. 13 shows a data-recording method used in the case where a recording medium is a BD-R.
Figure 14:
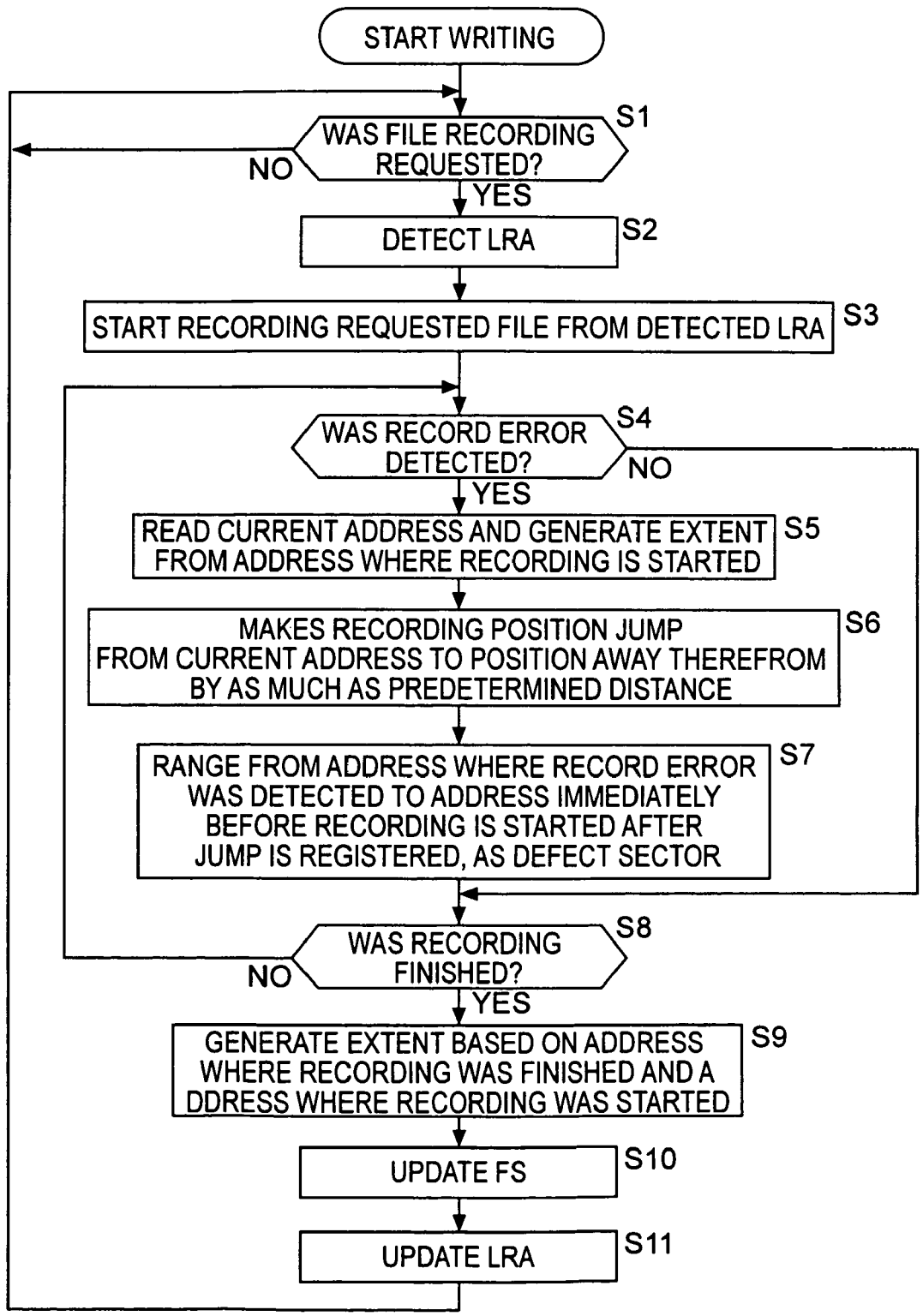
FIG. 14 is a flowchart illustrating write processing performed by the recording-and-reproducing mechanism shown in FIG. 3.
Figure 15:
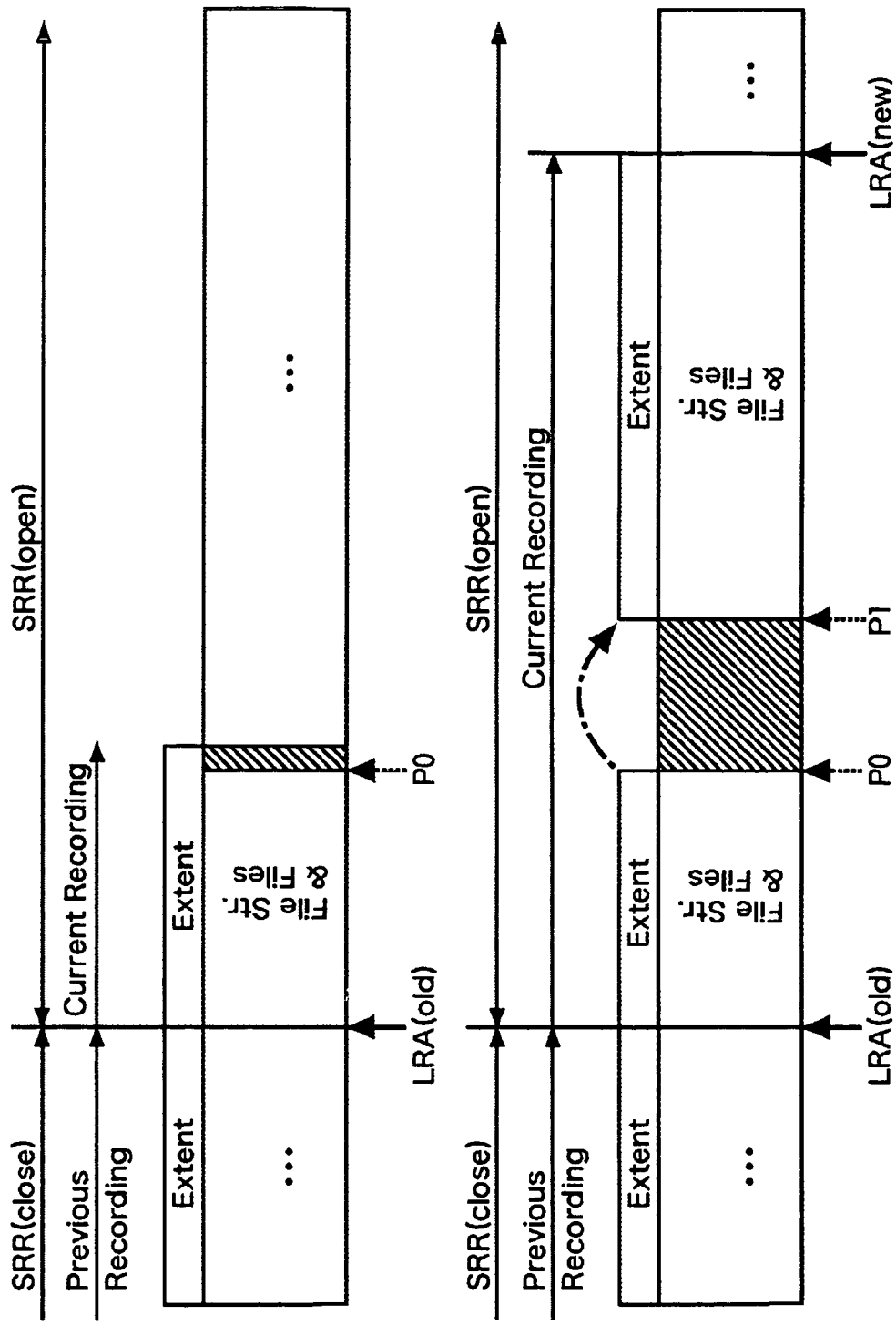
FIG. 15 is a diagram illustrating the write processing performed by the recording-and-reproducing mechanism shown in FIG. 3.
Figure 16:
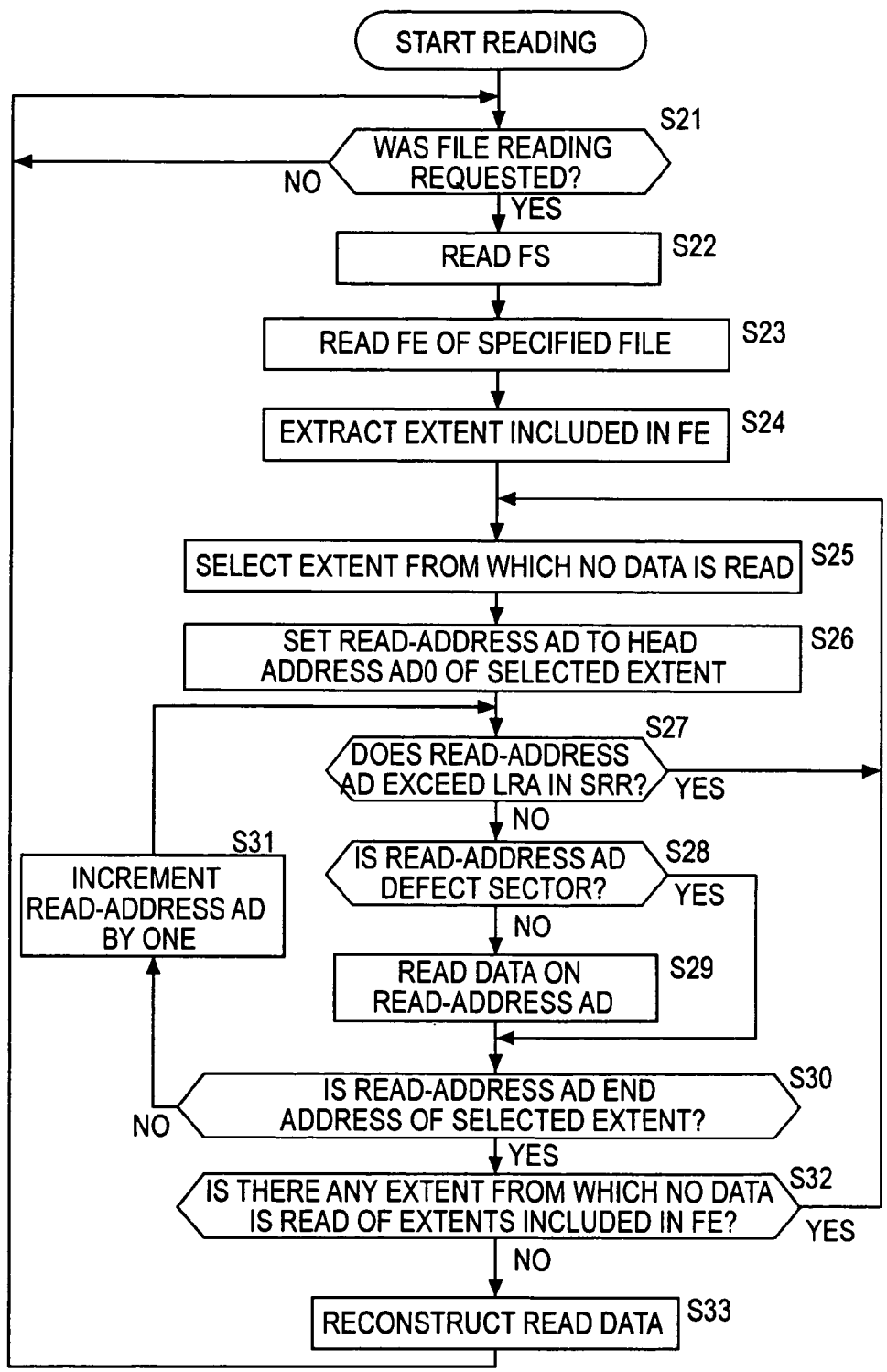
FIG. 16 is a flowchart illustrating read processing performed by the recording-and-reproducing mechanism shown in FIG. 3.
Figure 17:
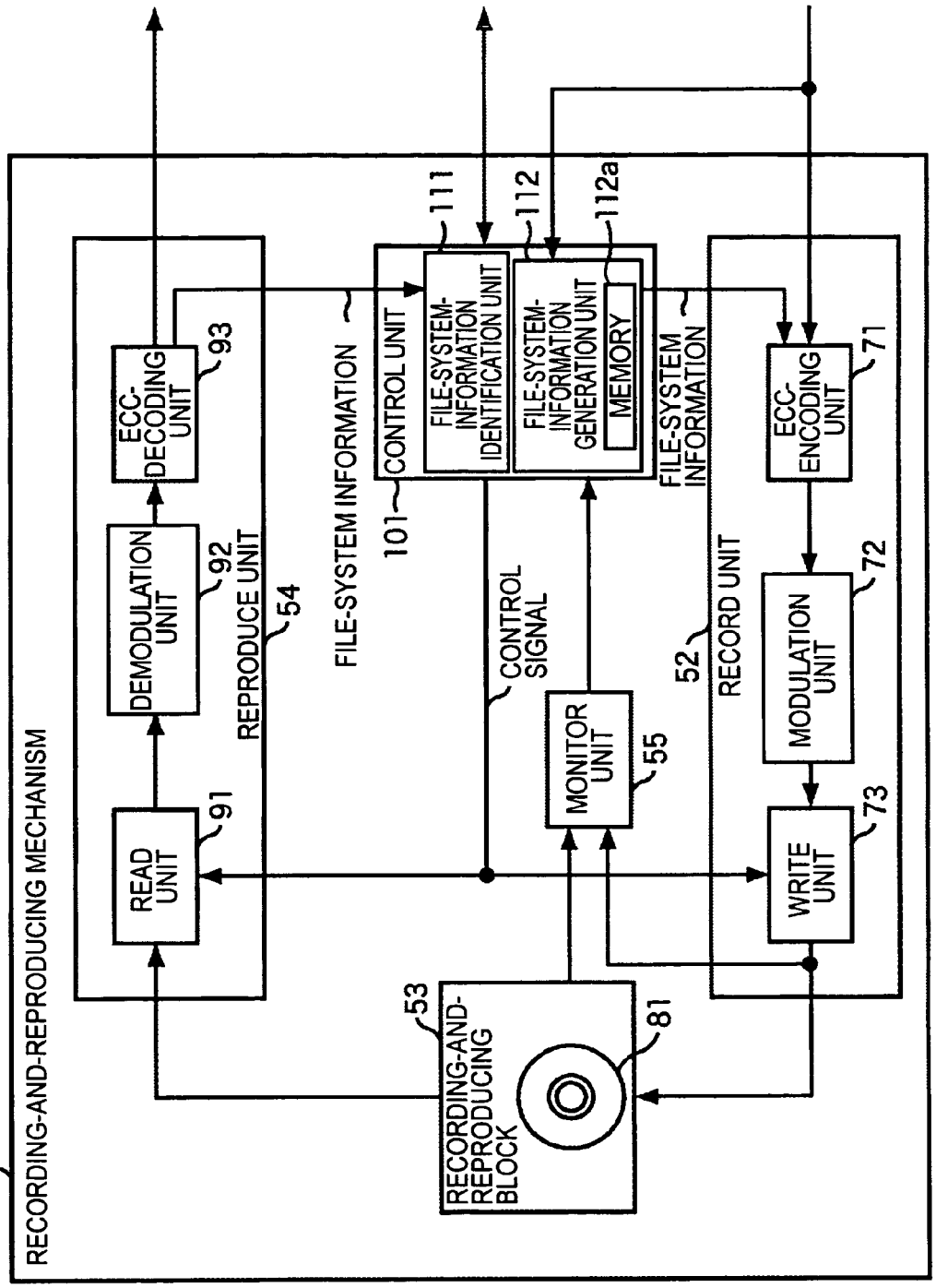
FIG. 17 is a diagram illustrating another configuration of the recording-and-reproducing mechanism shown in FIG. 3.
Figure 18:
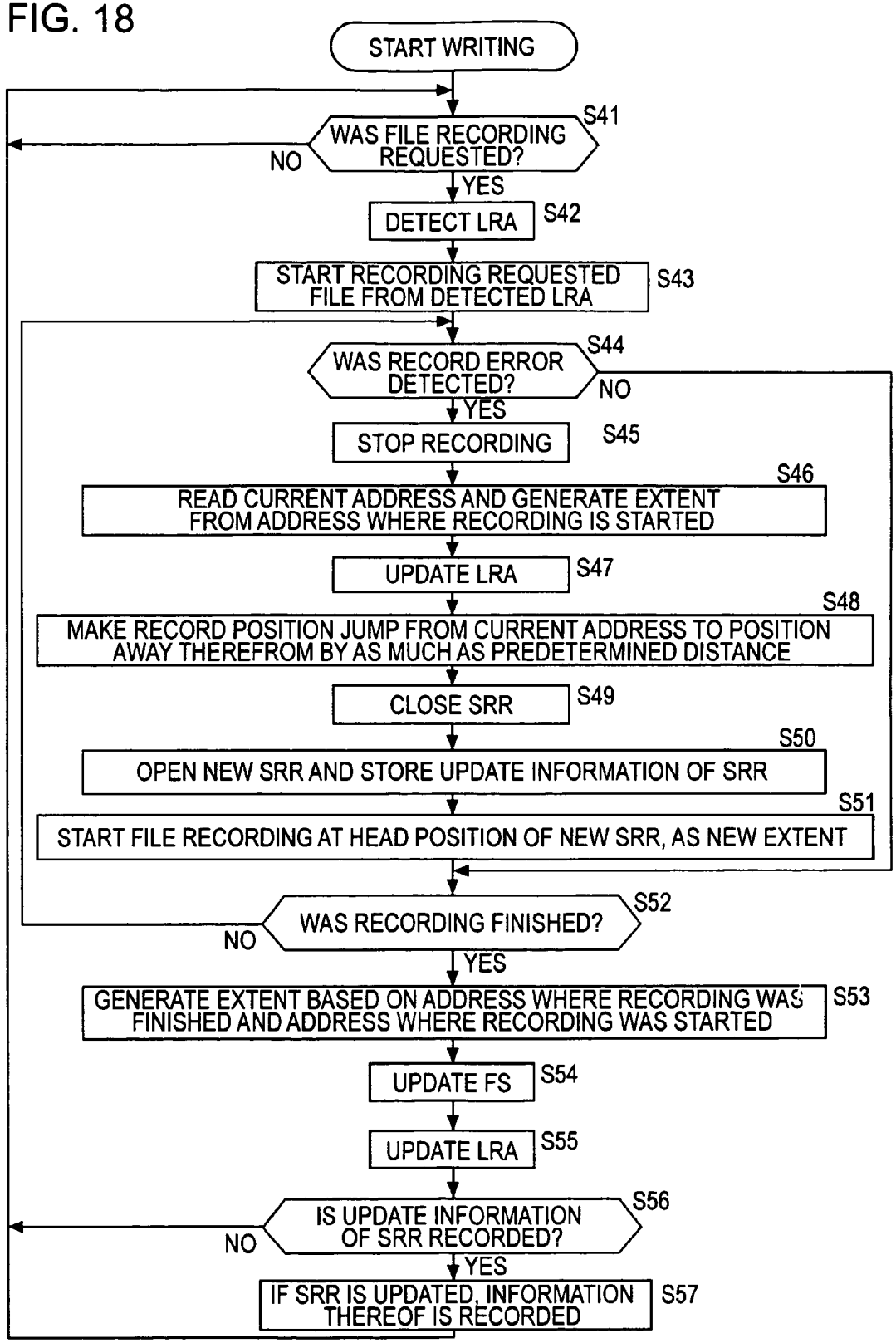
FIG. 18 is a flowchart illustrating write processing performed by the recording-and-reproducing mechanism shown in FIG. 17.
Figure 19:
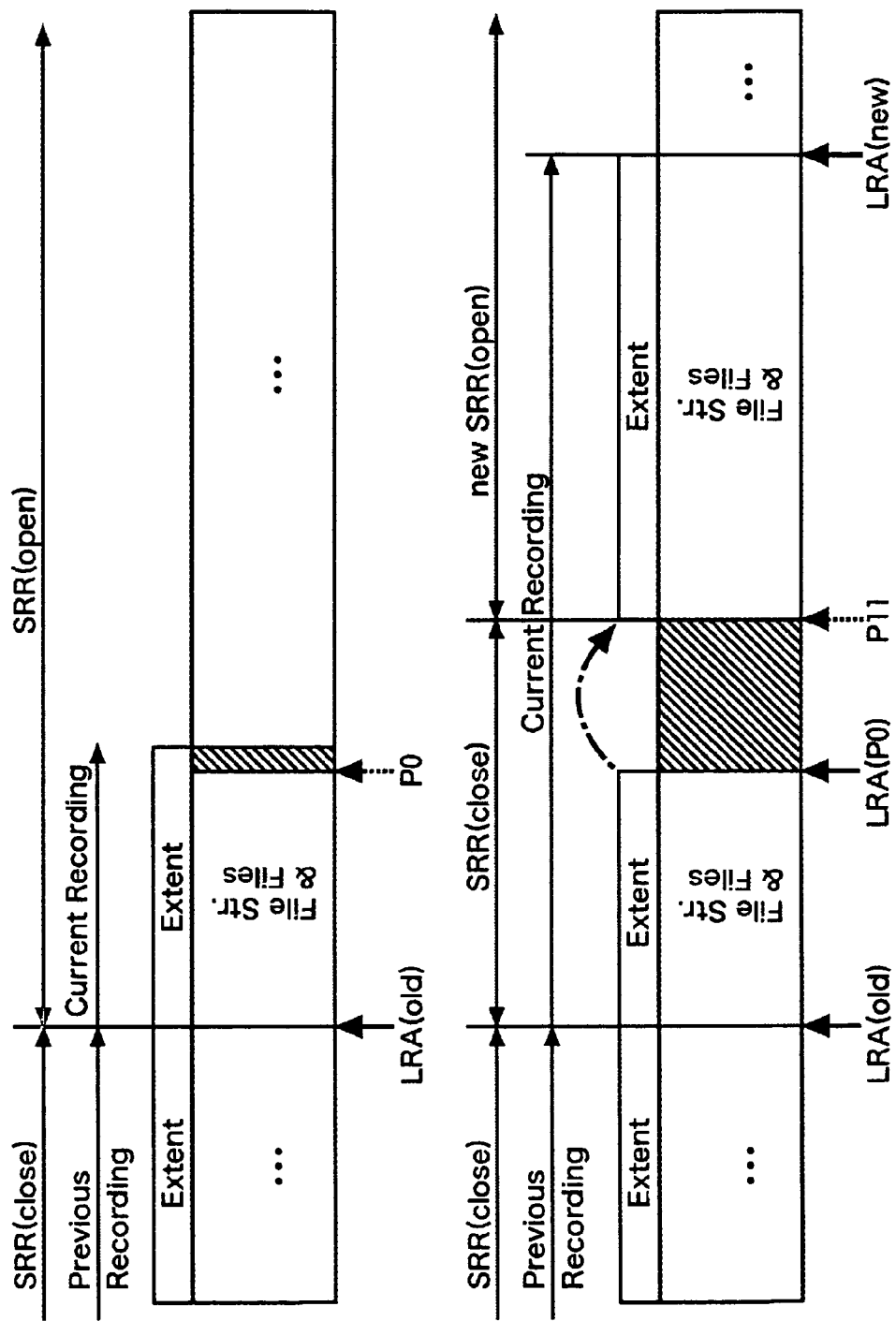
FIG. 19 is a diagram illustrating the write processing performed by the recording-and-reproducing mechanism shown in FIG. 17.

22: recording-and-reproducing mechanism, 51: control unit, 52: record unit, 53: recording-and-reproducing block, 54: reproduce unit, 61: file-system-information identification unit, 62: file-system-information generation unit, 71: ECC-encoding unit, 72: modulation unit, 73: write unit, 81: recording medium, 91: read unit, 92: demodulation unit, 93: ECC-decoding unit, 101: control unit, 111: file-system-information identification unit, 112: file-system-information generation unit, 112a: memory

The invention claimed is:

1. An information-recording system comprising:

recording unit configured to record data onto a recording medium, the data stored as a plurality of sequential recording ranges (SRR) wherein each SRR is either in an open mode or a closed mode, where the SRR is recordable in the open mode and the SRR is non-recordable in the closed mode, and the SRR further includes a last recorded area (LRA) indicating a position where last data was recorded by a previous recording;

record-position-information generation unit configured to generate record-position information within a SRR according to a position at which recording of a series of items of the data starts and a position at which the recording ends at virtual addresses on the recording medium, when the data is recorded onto the recording medium by the recording unit;

error-detection unit configured to determine whether or not an error occurs, when the data is recorded onto the recording medium by the recording unit; and operation-control unit configured to control the recording unit so that the data-record position is made to jump from the position where the error is detected to a position away from the error-detected position by as much as a predetermined distance, when the error-detection unit detects the error, wherein when the error-detection unit detects the error, the record-position-information generation unit determines the position at which the recording of the series of data items starts to be the record-start position and the position at which the error is detected to be the record-end position, at the virtual addresses on the recording medium, and generates the record-position information leaving the SRR in the open mode and generates another record-position information based on the position at which the recording started after the jump and the position at which the recording was finished, and wherein the record-position-information generation unit registers in a defect-sector-position registration list at least one range from the position where the error is detected to the position away from the error-detected position by as much as the predetermined distance, as a defect-sector area.

2. An information-recording system according to claim 1, wherein the recording medium is a write-once recording medium.

3. An information-recording system according to claim 1, wherein the recording medium is a write-once optical disk configured to record and/or reproduce data by using a blue-violet laser.

4. An information-recording system according to claim 1, wherein the data is included in a file managed based on Universal Disc Format.

5. An information-recording system according to claim 1, wherein the predetermined distance is a distance of several to several tens of megabytes.

6. The information-recording system of claim 1 wherein at least one SRR is set to the closed mode.

7. An information-recording method comprising:

a recording step for recording data onto a recording medium, the data stored as a plurality of sequential recording ranges (SRR) wherein each SRR is either in an open mode or a closed mode, where the SRR is recordable in the open mode and the SRR is non-recordable in the closed mode, and the SRR further includes a last recorded area (LRA) indicating a position where last data was recorded by a previous recording;

a record-position-information generation step for generating record-position information within a (SRR) according to a position at which recording of a series of items of the data starts and a position at which the recording ends at virtual addresses on the recording medium, when the data is recorded onto the recording medium through the recording step;

an error-detection step for determining whether or not an error occurs, when the data is recorded onto the recording medium through the recording step; and an operation-control step for controlling processing corresponding to the recording step so that the data-record position is made to jump from the position where the error is detected to a position away from the error-detected position by a predetermined distance, when the error is detected through the error-detection step, wherein when the error is detected through the error-detection step, the record-position-information generation step allows determining the position at which the recording of the series of data items starts to be the record-start position and the position at which the error is detected to be the record-end position, at the virtual addresses on the recording medium, and generating the record-position information, leaving the SRR in the open mode and generates another record-position information based on the position at which the recording started after the jump and the position at which the recording was finished, and registering in a defect-sector-position registration list at least one range from the position where the error is detected to the position away from the error-detected position by as much as the predetermined distance, as a defect-sector area.

8. The information-recording method of claim 7 wherein at least one SRR is set to the closed mode.

9. A non-transitory computer-readable storage medium storing a computer-readable program which when executed by a computer performs processing comprising:

a recording-control step for controlling recording data onto a recording medium, the data stored as a plurality of sequential recording ranges (SRR) wherein each SRR is either in an open mode or a closed mode, where the SRR is recordable in the open mode and the SRR is non-recordable in the closed mode, and the SRR further includes a last recorded area (LRA) indicating a position where last data was recorded by a previous recording;

a record-position-information generation control step for controlling generation of record-position information according to a position at which recording of a series of items of the data starts and a position at which the recording ends at virtual addresses on the recording medium, when the data is recorded onto the recording medium through the recording-control step;

an error-detection control step for determining whether or not an error occurs, when the data is recorded onto the recording medium through the recording-control step; and an operation-control step for controlling processing corresponding to the recording-control step so that the data-record position is made to jump from the position where the error is detected to a position away from the error-detected position by a predetermined distance, when the error is detected through the error-detection control step, wherein when the error is detected through the error-detection control step, the record-position-information generation control step allows determining the position at which the recording of the series of data items starts to be the record-start position and the position at which the error is detected to be the record-end position, at the virtual addresses on the recording medium, and generating the record-position information leaving the SRR in the open mode and generates another record-position information based on the position at which the recording started after the jump and the position at which the recording was finished, and registering in a defect-sector-position registration list at least one range from the position where the error is detected to the position away from the error-detected position by as much as the predetermined distance, as a defect-sector area.

10. The computer-readable storage medium of claim 9 wherein at least one SRR is set to the closed mode.

* * * * *